(12) United States Patent
Fujiwara et al.

(10) Patent No.: US 9,780,961 B2
(45) Date of Patent: Oct. 3, 2017

(54) COMMUNICATION SYSTEM, RELAY APPARATUS, CONTROL APPARATUS, SERVER APPARATUS, CONTROL METHOD, AND INFORMATION PROCESSING METHOD

(71) Applicant: SHARP KABUSHIKI KAISHA, Osaka-shi, Osaka (JP)

(72) Inventors: Akira Fujiwara, Osaka (JP); Masaya Nakamura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 117 days.

(21) Appl. No.: 14/664,299

(22) Filed: Mar. 20, 2015

(65) Prior Publication Data

US 2015/0280934 A1    Oct. 1, 2015

(30) Foreign Application Priority Data

Mar. 25, 2014 (JP) .................................. 2014-061821

(51) Int. Cl.
*H04W 4/00* (2009.01)
*H04L 12/28* (2006.01)

(52) U.S. Cl.
CPC ...... *H04L 12/2818* (2013.01); *H04L 12/2825* (2013.01)

(58) Field of Classification Search
None
See application file for complete search history.

(56) References Cited

U.S. PATENT DOCUMENTS

| 2011/0046798 A1* | 2/2011 | Imes | F24F 11/0086 700/286 |
| 2014/0156093 A1* | 6/2014 | Brian | G01D 4/002 700/291 |
| 2015/0120006 A1* | 4/2015 | Terashima | G05B 15/02 700/40 |

FOREIGN PATENT DOCUMENTS

| JP | 2-217039 A | 8/1990 |
| JP | 6-350620 A | 12/1994 |
| JP | 2004-348319 | 12/2004 |
| JP | 2005-005951 A | 1/2005 |
| JP | 2005-065164 | 3/2005 |
| WO | 2014/024484 A1 | 2/2014 |

* cited by examiner

*Primary Examiner* — Chi H Pham
*Assistant Examiner* — Fahmida Chowdhury
(74) *Attorney, Agent, or Firm* — Nixon & Vanderhye P.C.

(57) ABSTRACT

A HEMS controller repeatedly transmits a predetermined signal to a control-target appliance at a set time interval in order to detect a change in a status of the control-target appliance. If the status changes, the HEMS controller notifies a smartphone of the changed status via a server apparatus. In a state where the time interval is set to a first time interval, when receiving a control instruction for controlling an operation of the control-target appliance from the smartphone via the server apparatus, the HEMS controller transmits the control instruction to the control-target appliance. In response to the transmission of the control instruction to the control-target appliance, the HEMS controller changes the time interval to a second time interval shorter than the first time interval.

13 Claims, 22 Drawing Sheets

| CONTROL-TARGET APPLIANCE | TIME INTERVAL P (SECONDS) (POLLING INTERVAL) |
|---|---|
| AIR CONDITIONER | 5 |
| AIR CLEANER | 5 |
| ELECTRIC SHUTTER | 10 |

| CONTROL-TARGET APPLIANCE | STATUS | RECEIVED LATEST CONTROL INSTRUCTION |
|---|---|---|
| AIR CONDITIONER | POWER ON, HEAT, 20°C | HEAT, 20°C |
| AIR CLEANER | STATUS UNKNOWN | POWER OFF |
| ELECTRIC SHUTTER | STATUS UNKNOWN | OPEN |

20A

| CONTROL-TARGET APPLIANCE | TYPE OF CONTROL INSTRUCTION | TIME INTERVAL P (SECONDS) (POLLING INTERVAL) |
|---|---|---|
| AIR CONDITIONER | POWER | 2 |
|  | OTHERS | 5 |
| AIR CLEANER | (ALL) | 5 |
| ELECTRIC SHUTTER | TIMER OPERATION SETTING | 5 |
|  | OPEN/CLOSE OPERATION SETTING | 15 |
|  | OTHERS | 10 |

FIG. 20

(i)
| TIME INTERVAL P (SECONDS) (POLLING INTERVAL) | 10 (= P(1)) |
|---|---|
| NUMBER OF TRANSMISSIONS OF STATUS ACQUISITION REQUEST | 1 |

⇩

(ii)
| TIME INTERVAL P (SECONDS) (POLLING INTERVAL) | 9 (= P(2)) |
|---|---|
| NUMBER OF TRANSMISSIONS OF STATUS ACQUISITION REQUEST | 1 |

⇩

(iii)
| TIME INTERVAL P (SECONDS) (POLLING INTERVAL) | 8 (= P(3)) |
|---|---|
| NUMBER OF TRANSMISSIONS OF STATUS ACQUISITION REQUEST | 2 |

⇩

(iv)
| TIME INTERVAL P (SECONDS) (POLLING INTERVAL) | 8 (= P(4)) |
|---|---|
| NUMBER OF TRANSMISSIONS OF STATUS ACQUISITION REQUEST | – |

| TIME INTERVAL P (SECONDS) (POLLING INTERVAL) | 9 (= P(m)) |
|---|---|
| NUMBER OF TRANSMISSIONS OF STATUS ACQUISITION REQUEST | 2 |

⇩

(ii)

| TIME INTERVAL P (SECONDS) (POLLING INTERVAL) | 9 (= P(m+1)) |
|---|---|
| NUMBER OF TRANSMISSIONS OF STATUS ACQUISITION REQUEST | 3 |

⇩

(iii)

| TIME INTERVAL P (SECONDS) (POLLING INTERVAL) | 10 (= P(m+2)) |
|---|---|
| NUMBER OF TRANSMISSIONS OF STATUS ACQUISITION REQUEST | − |

| TIME INTERVAL P (SECONDS) (POLLING INTERVAL) | 9 (= P(n)) |
|---|---|
| NUMBER OF TRANSMISSIONS OF STATUS ACQUISITION REQUEST | 2 |

⇩

(ii)

| TIME INTERVAL P (SECONDS) (POLLING INTERVAL) | 9 (= P(n + 1)) |
|---|---|
| NUMBER OF TRANSMISSIONS OF STATUS ACQUISITION REQUEST | 1 |

⇩

(iii)

| TIME INTERVAL P (SECONDS) (POLLING INTERVAL) | 8 (= P(n + 2)) |
|---|---|
| NUMBER OF TRANSMISSIONS OF STATUS ACQUISITION REQUEST | — |

COMMUNICATION SYSTEM, RELAY APPARATUS, CONTROL APPARATUS, SERVER APPARATUS, CONTROL METHOD, AND INFORMATION PROCESSING METHOD

This application claims priority to Japan Application No. 2014-061821, filed Mar. 25, 2014, the entire content of which is hereby incorporated by reference.

BACKGROUND

1. Field

The present disclosure relates to a communication system including a control-target appliance, a relay apparatus, a control apparatus, a server apparatus, a control method, and an information processing method.

2. Description of the Related Art

There is a technique of changing a transmission interval of a request signal for acquiring information representing a status of a home appliance or the like (a polling interval for a home appliance or the like) to check an operation status of the home appliance or the like.

As an example of such a technique, Japanese Unexamined Patent Application Publication No. 2004-348319 discloses a control system including a terminal apparatus that communicates with a home appliance or facility appliance and that manages and controls the status of the appliance. The terminal apparatus includes a communication unit that communicates with a home appliance or facility appliance at a certain interval, an operation status management unit that acquires and manages status information, and a communication interval changing unit that changes, when receiving status change information from the home appliance or facility appliance, a communication interval for the foregoing appliance. The home appliance or facility appliance includes an operation status monitoring unit that monitors whether or not an operation status has changed, and an appliance communication unit that transmits status information representing a changed operation status. More specifically, in a case where the operation status of the home appliance or facility appliance has changed from a shutdown status to an operating status, the terminal apparatus causes the communication interval changing unit to shorten the interval of acquiring operation status information.

Japanese Unexamined Patent Application Publication No. 2005-65164 discloses, as a technique of changing the above-described transmission interval, a communication control processing apparatus including a polling processing unit that includes a polling information storage unit and a polling information setting processing unit that sets information stored in the polling information storage unit. The polling information setting processing unit sets information stored in the polling information storage unit in response to a request for setting polling information from an appliance connected to a network. Accordingly, the communication control processing apparatus changes an operation regarding polling. More specifically, the communication control processing apparatus changes a polling interval in a case where the number of appliances connected to the network increases by more than expected, in a case where there occurs more frequently than expected a state in which control in the main body of an appliance is performed, or in a case where a power-off period is very long.

The control system according to Japanese Unexamined Patent Application Publication No. 2004-348319 has a configuration in which the terminal apparatus changes a communication interval (a transmission interval of a request signal or a polling interval) for a home appliance or the like after receiving, from the home appliance or the like, status change information indicating that the status of the home appliance or the like has changed due to power-on. In this way, the terminal apparatus according to Japanese Unexamined Patent Application Publication No. 2004-348319 merely changes the transmission interval of a request signal in response to the receipt of status change information transmitted from a home appliance or the like.

Therefore, in the configuration of transmitting a control instruction (including an instruction to turn on the power) from a terminal apparatus to a home appliance or the like, the technique according to Japanese Unexamined Patent Application Publication No. 2004-348319 does not enable the terminal apparatus to quickly receive information representing a change in the status of the home appliance or the like caused by the control instruction. More specifically, in the configuration according to Japanese Unexamined Patent Application Publication No. 2004-348319, the transmission interval of a request signal is not changed until status change information indicating that the power has been turned on is received. Thus, the terminal apparatus is not able to quickly receive the status change information indicating that the power has been turned on.

Also in the technique according to Japanese Unexamined Patent Application Publication No. 2005-65164, as in the technique according to Japanese Unexamined Patent Application Publication No. 2004-348319, the communication processing control apparatus is not able to quickly receive information representing a change in the status of the home appliance or the like caused by the control instruction.

SUMMARY

According to an aspect of the present disclosure, a communication system includes a terminal apparatus, a relay apparatus, and a control-target appliance, when the relay apparatus receives, from the terminal apparatus, a control instruction for controlling an operation of the control-target appliance, the relay apparatus setting a transmission interval of repeatedly transmitting, in order to detect a change in a status of the control-target appliance, a signal to the control-target appliance to be shorter than a preset time interval, based on the change in the status having been detected, the relay apparatus providing the terminal apparatus with notification of the status having been changed.

Preferably, the relay apparatus includes a server apparatus and a control apparatus communicatively connected to the server apparatus, the control apparatus includes a first communication unit configured to repeatedly transmit the signal to the control-target appliance at the time interval and transmit the control instruction to the control-target appliance when the first communication unit receives the control instruction from the terminal apparatus via the server apparatus, and a second communication unit configured to provide, based on the change in the status having been detected, the terminal apparatus with the notification of the status having been changed, the notification being provided via the server apparatus, and a setting unit configured to set the time interval, when the first communication unit receives the control instruction from the terminal apparatus via the server apparatus while the time interval is set at a first time interval by the setting unit, the setting unit sets the time interval at a second time interval shorter than the first time interval.

Preferably, the communication system includes a first appliance and a second appliance each as the control-target appliance, and the second time interval differs between a case where the control instruction is for the first appliance and a case where the control instruction is for the second appliance.

Preferably, the setting unit sets the second time interval to differ between a case where a type of the control instruction for the first appliance is a first type and a case where the type of the control instruction for the first appliance is a second type.

Preferably, the server apparatus stores data including identification information for the control-target appliance, the type of the control instruction, and the second time interval that are associated with one another, and based on the first type of the control instruction for the first appliance having been received from the terminal apparatus, the server apparatus makes reference to the data to provide the control apparatus with notification of the second time interval associated with the identification information for the first appliance and the first type.

Preferably, based on the signal having been transmitted once at the second time interval, the setting unit sets the time interval at a third time interval shorter than the second time interval.

Preferably, the control apparatus further includes a detecting unit configured to detect the number of transmissions of the signal until the change in the status is detected after the control instruction is transmitted to the control-target appliance, the server apparatus stores the second time interval, the server apparatus changes the stored second time interval using the detected number of transmissions such that the required number of transmissions of the signal to detect the change in the status again becomes less than the detected number of transmissions, the server apparatus provides the control apparatus with notification of the second time interval having been changed, based on the control instruction having been transmitted to the control-target appliance again, the setting unit sets the time interval at the second time interval having been changed, and based on the signal having been transmitted once at the second time interval having been changed, the setting unit sets the time interval at the third time interval.

Preferably, the communication system includes a first appliance and a second appliance each as the control-target appliance, and the second time interval differs between a case where the control instruction is for the first appliance and a case where the control instruction is for the second appliance.

Preferably, the setting unit sets the second time interval to differ between a case where a type of the control instruction for the first appliance is a first type and a case where the type of the control instruction for the first appliance is a second type.

Preferably, based on the control instruction having been transmitted to the control-target appliance, the setting unit sets the time interval at the second time interval.

According to another aspect of the present disclosure, there is provided a relay apparatus capable of communicating with a terminal apparatus and a control-target appliance, when the relay apparatus receives, from the terminal apparatus, a control instruction for controlling an operation of the control-target appliance, the relay apparatus setting a transmission interval of repeatedly transmitting, in order to detect a change in a status of the control-target appliance, a signal to the control-target appliance to be shorter than a preset time interval, based on the change in the status having been detected, the relay apparatus providing the terminal apparatus with notification of the status having been changed.

According to still another aspect of the present disclosure, there is provided a control apparatus capable of communicating with a server apparatus and a control-target appliance, including: a first communication unit configured to repeatedly transmit a signal for detecting a change in a status of the control-target appliance to the control-target appliance at a set time interval and transmit a control instruction for controlling an operation of the control-target appliance to the control-target appliance when the first communication unit receives the control instruction from a terminal apparatus via the server apparatus; and a second communication unit configured to provide, based on the change in the status having been detected, the terminal apparatus with notification of the status having been changed, the notification being provided via the server apparatus, and a setting unit configured to set the time interval, when the first communication unit receives the control instruction from the terminal apparatus via the server apparatus while the time interval is set at a first time interval by the setting unit, the setting unit setting the time interval at a second time interval shorter than the first time interval.

According to yet another aspect of the present disclosure, there is provided a server apparatus capable of communicating with a terminal apparatus and a control apparatus for controlling a control-target appliance including: a storage unit configured to store data including identification information for the control-target appliance and a time interval that are associated with each other, the time interval defining a transmission interval of a signal used by the control apparatus in order to detect a change in a status of the control-target appliance; and a communication unit configured to, based on a control instruction for the control-target appliance having been received from the terminal apparatus, make reference to the data to provide the control apparatus with notification of the time interval associated with the identification information for the control-target appliance.

According to still another aspect of the present disclosure, there is provided a control method for a relay apparatus capable of communicating with a terminal apparatus and a control-target appliance, including the steps of: receiving, from the terminal apparatus, a control instruction for controlling an operation of the control-target appliance; and when the control instruction is received, setting a transmission interval of repeatedly transmitting, in order to detect a change in a status of the control-target appliance, a signal to the control-target appliance to be shorter than a preset time interval.

According to yet another aspect of the present disclosure, there is provided a control method for a control apparatus capable of communicating with a server apparatus and a control-target appliance, including the steps of: repeatedly transmitting a signal for detecting a change in a status in the control-target appliance to the control-target appliance at a set time interval and transmitting a control instruction for controlling an operation of the control-target appliance to the control-target appliance when the control instruction is received from a terminal apparatus via the server apparatus; providing, based on the change in the status having been detected, the terminal apparatus with the notification of the status having been changed, the notification being provided via the server apparatus; and when the control apparatus receives the control instruction from the terminal apparatus via the server apparatus while the time interval is set at a first time interval, setting the time interval at a second time interval shorter than the first time interval.

According to still another aspect of the present disclosure, there is provided an information processing method for a server apparatus capable of communicating with a terminal apparatus and a control apparatus for controlling a control-target appliance, the server apparatus storing data including identification information for the control-target appliance and a time interval that are associated with each other, the time interval defining a transmission interval of a signal used by the control apparatus in order to detect a change in a status of the control-target appliance, the information processing method including the steps of: receiving a control instruction for the control-target appliance from the terminal apparatus; and based on the control instruction having been received, making reference to the data to provide the control apparatus with notification of the time interval associated with the identification information for the control-target appliance.

The above-described and other features and aspects of the present disclosure will become apparent from the detailed description given below with reference to the attached drawings.

BRIEF DESCRIPTION OF THE DRAWINGS

FIG. 20 is a diagram for describing a first specific example of update processing according to the fourth embodiment;

FIG. 22 is a diagram for describing a third specific example of update processing according to the fourth embodiment;

FIG. 23 is a diagram for describing a fourth specific example of update processing according to the fourth embodiment.

DESCRIPTION OF THE EMBODIMENTS

Figure 1:
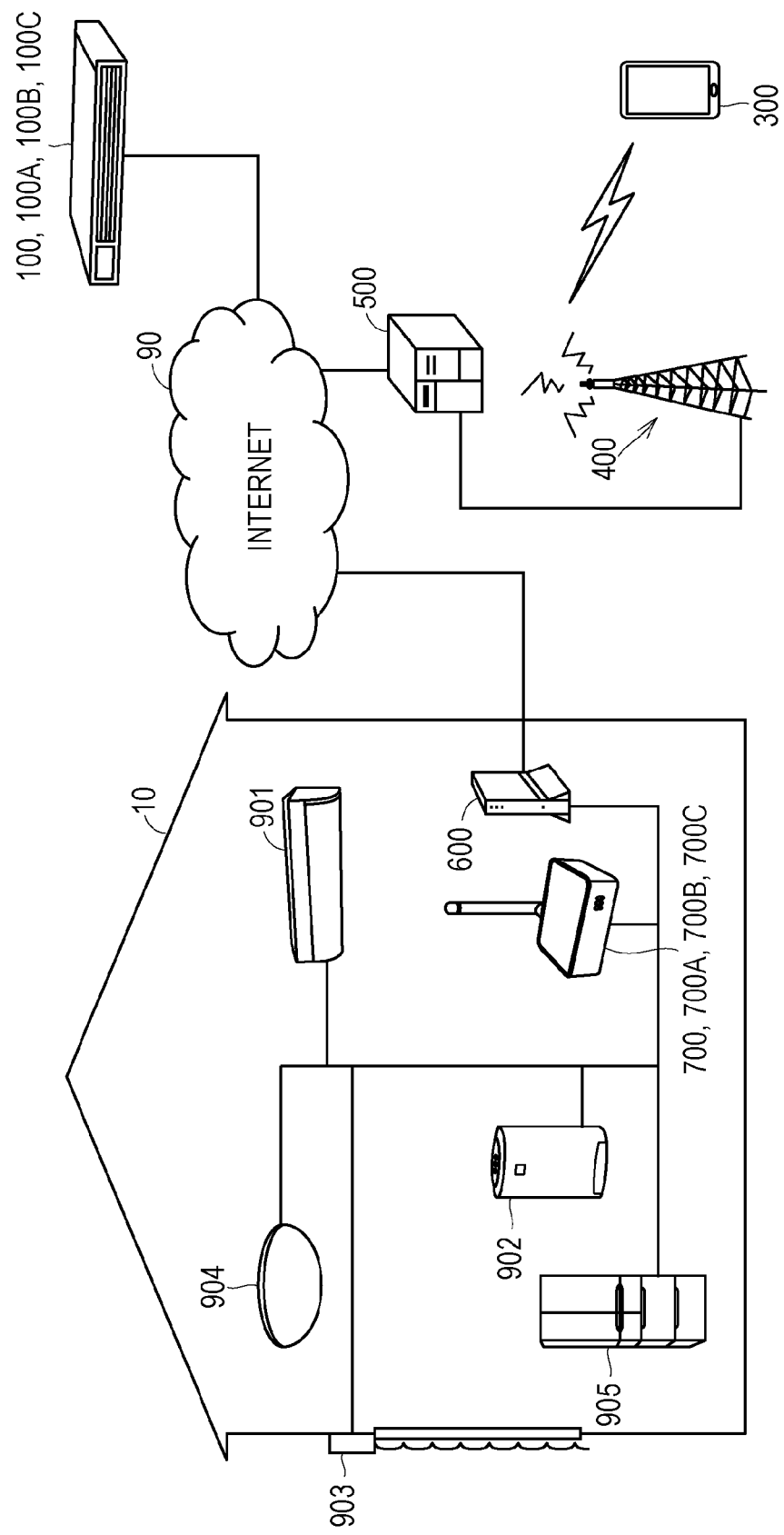
FIG. 1 is a diagram for describing the schematic configuration of a communication system according to a first embodiment of the present disclosure.

Hereinafter, a communication system according to embodiments of the present disclosure will be described with reference to the drawings. In the following description, the same components are denoted by the same reference numerals and have the same names and functions. Thus, the detailed description thereof is not repeated.

In the following embodiments, a description will be given of a configuration of changing a transmission interval of a status acquisition request (a polling interval). The status acquisition request (a predetermined signal) is transmitted by a home energy management system (HEMS) controller to a control-target appliance in order to acquire information representing a status of the control-target appliance, such as a home appliance. Also, the status acquisition request is used to detect a change in the status of the control-target appliance, which will be described below in detail.

First Embodiment

In a first embodiment, a description will be given of a configuration in which a HEMS controller shortens a polling interval (a transmission interval of a request signal) for a control-target appliance in response to the receipt of a control instruction from a smartphone via a server apparatus. Specifically, a description will be given of a configuration in which the HEMS controller transmits the request signal to the control-target appliance at a transmission interval based on the type of the control-target appliance in response to the receipt of a control instruction from the smartphone.

A. Overview of System Configuration

FIG. 1 is a diagram for describing the schematic configuration of a communication system 1. Referring to FIG. 1, the communication system 1 includes a server apparatus 100, a smartphone 300, a base station apparatus 400, a mobility management entity (MME) 500, a broadband router 600, a HEMS controller 700, an air conditioner 901, an air cleaner 902, an electric shutter 903, a lighting apparatus 904, and a refrigerator 905.

The broadband router 600, the HEMS controller 700, the air conditioner 901, the air cleaner 902, the electric shutter 903, the lighting apparatus 904, and the refrigerator 905 are installed in a building 10. Hereinafter, the air conditioner 901, the air cleaner 902, the electric shutter 903, the lighting apparatus 904, and the refrigerator 905 are collectively referred to as "control-target appliances 900".

The broadband router 600 is connected to an Internet 90. The broadband router 600 supports at least a wired local area network (LAN). The broadband router 600 may support a wireless LAN, and the plurality of control-target appliances 900 may be connected to the broadband router 600 by using the wireless LAN.

The HEMS controller 700 is connected to the broadband router 600 by using the wired LAN. The HEMS controller 700 is able to mutually communicate with the plurality of control-target appliances 900. The HEMS controller 700 functions as a relay in the communication system 1, and also functions as a control apparatus for the control-target appliances 900.

Normally, the HEMS controller 700 transmits a status acquisition request to (performs polling for) all the control-target appliances 900 at a predetermined time interval C (for example, fifteen minutes). The HEMS controller 700 changes the transmission interval (time interval) of the status acquisition request in response to the receipt of a control instruction from the smartphone 300 via the server apparatus 100. The change of the time interval will be described below in detail. The HEMS controller 700 stores the time interval C in advance.

The smartphone 300 is connectable to the Internet 90 by using a third generation (3G) line, a Long Term Evolution (LTE) line, or the like. The smartphone 300 is connected to the Internet 90 via the base station apparatus 400 and the MME 500. The smartphone 300 is a mobile apparatus and thus may be located outside or inside the building 10.

Hereinafter, a description will be given by focusing on the air conditioner 901, the air cleaner 902, and the electric shutter 903 among the plurality of control-target appliances 900 in order to simplify the description. Note that processing similar to that for the air conditioner 901, the air cleaner 902, and the electric shutter 903 is performed on the lighting apparatus 904 and the refrigerator 905.

Figures 2A, 2B, 3:
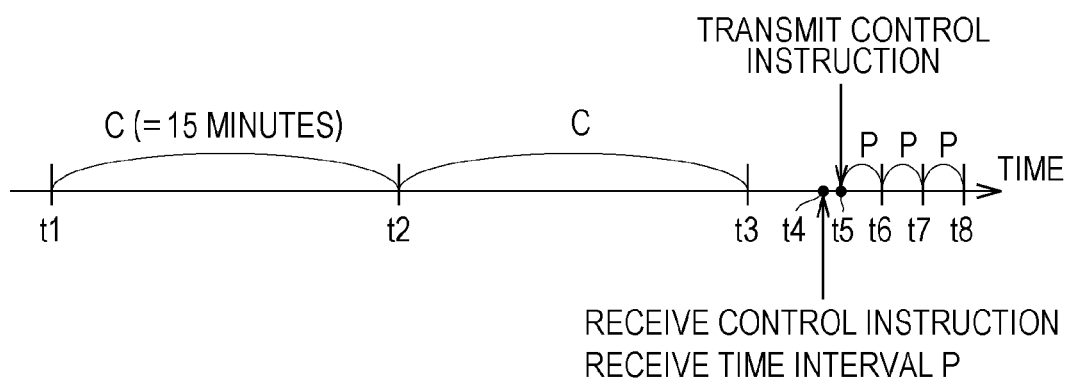
FIGS. 2A and 2B are diagrams for describing the overview of databases stored in a server apparatus according to the first embodiment.
FIG. 3 is a diagram for describing the overview of processing performed in the communication system according to the first embodiment.

FIGS. 2A and 2B are diagrams for describing the overview of databases 20 and 30 stored in the server apparatus 100. FIG. 2A is a diagram illustrating the schematic configuration of the database 20. FIG. 2B is a diagram illustrating the schematic configuration of the database 30.

Referring to FIG. 2A, the database 20 specifies transmission intervals of polling (hereinafter referred to as "time intervals P") that are set for the individual control-target appliances 900 (specifically, individual pieces of identification information about the control-target appliances 900). A time interval P of five seconds is set for the air conditioner 901 and the air cleaner 902. A time interval P of ten seconds is set for the electric shutter 903.

Referring to FIG. 2B, the database 30 stores, for each control-target appliance 900, information representing the latest status. The database 30 at least stores a received latest control instruction in association with a corresponding one of the control-target appliances 900. Further, the database 30 is updated every time the server apparatus 100 acquires information representing a status from the control-target appliance 900.

The database 30 shows that the status information acquired from the air conditioner 901 through the latest status acquisition request indicates that, for example, the power is on, the air conditioner 901 is operating in a heating mode, and the set temperature is 20° C. Also, the database 30 shows that the received latest control instruction for the air conditioner 901 is an instruction to operate in the heating mode and to set the temperature to 20° C.

Further, regarding the air cleaner 902, a message "status unknown" is stored in the database 30 because the server apparatus 100 has not acquired status information about the air cleaner 902 from the air cleaner 902 after transmitting a control instruction (to turn off the power) for the air cleaner 902 to the HEMS controller 700. Also, regarding the electric shutter 903, a message "status unknown" is stored in the database 30 because the server apparatus 100 has not acquired status information about the electric shutter 903 from the electric shutter 903 after transmitting a control instruction (to open the shutter) for the electric shutter 903 to the HEMS controller 700.

B. Overview of Processing

Hereinafter, a description will be given by focusing on one control-target appliance 900 to which the user of the smartphone 300 will transmit a control instruction among the plurality of control-target appliances 900. For the convenience of description, it is assumed that the one control-target appliance 900 is, for example, the air conditioner 901.

FIG. 3 is a diagram for describing the overview of processing performed in the communication system 1. Referring to FIG. 3, the HEMS controller 700 transmits a status acquisition request to the air conditioner 901 at a time interval C (for example, fifteen minutes). Specifically, the HEMS controller 700 transmits a status acquisition request to the air conditioner 901 at times t1, t2 (=t1+C), and t3 (=t2+C).

The HEMS controller 700 receives a control instruction and information representing a time interval P for the air conditioner 901 ("five seconds" in FIG. 2A) from the server apparatus 100 at time t4 (<t3+C), and then transmits the control instruction to the air conditioner 901 at time t5. After transmitting the control instruction to the air conditioner 901, the HEMS controller 700 sets the transmission interval of a status acquisition request to the time interval P (five seconds), which is shorter than the time interval C (fifteen minutes).

After this, the HEMS controller 700 transmits a status acquisition request to the air conditioner 901 at times t6 (=t5+5 seconds), t7 (=t6+5 seconds), t8 (=t7+5 seconds), . . . . The HEMS controller 700 changes the transmission interval of a status acquisition request from the time interval P to the time interval C when detecting a change in the status of the air conditioner 901.

In the description given above, the control-target appliance 900 to which a control instruction is to be transmitted is the air conditioner 901. In a case where the control-target appliance 900 to which a control instruction is to be transmitted is the electric shutter 903, for example, when the HEMS controller 700 receives a control instruction and information representing a time interval P for the electric shutter 903 ("ten seconds" in FIG. 2A) from the server apparatus 100 at time t4, the HEMS controller 700 sets the transmission interval of a status acquisition request to the time interval P (ten seconds), which is shorter than the time interval C (fifteen minutes). After this, the HEMS controller 700 transmits a status acquisition request to the electric shutter 903 at an interval of ten seconds.

In a case where the control-target appliance 900 to which a control instruction is to be transmitted is the air cleaner 902, the same processing as that for the air conditioner 901 is performed, and thus the description is not repeated here.

With the above-described configuration, the HEMS controller 700 is able to quickly receive information representing a change in the status of the control-target appliance 900 caused by a control instruction, compared to the case of transmitting a status acquisition request at the time interval C. Accordingly, the smartphone 300 is able to quickly receive information representing a change in the status of the control-target appliance 900 from the HEMS controller 700 via the server apparatus 100.

C. Control Structure

Figure 4:
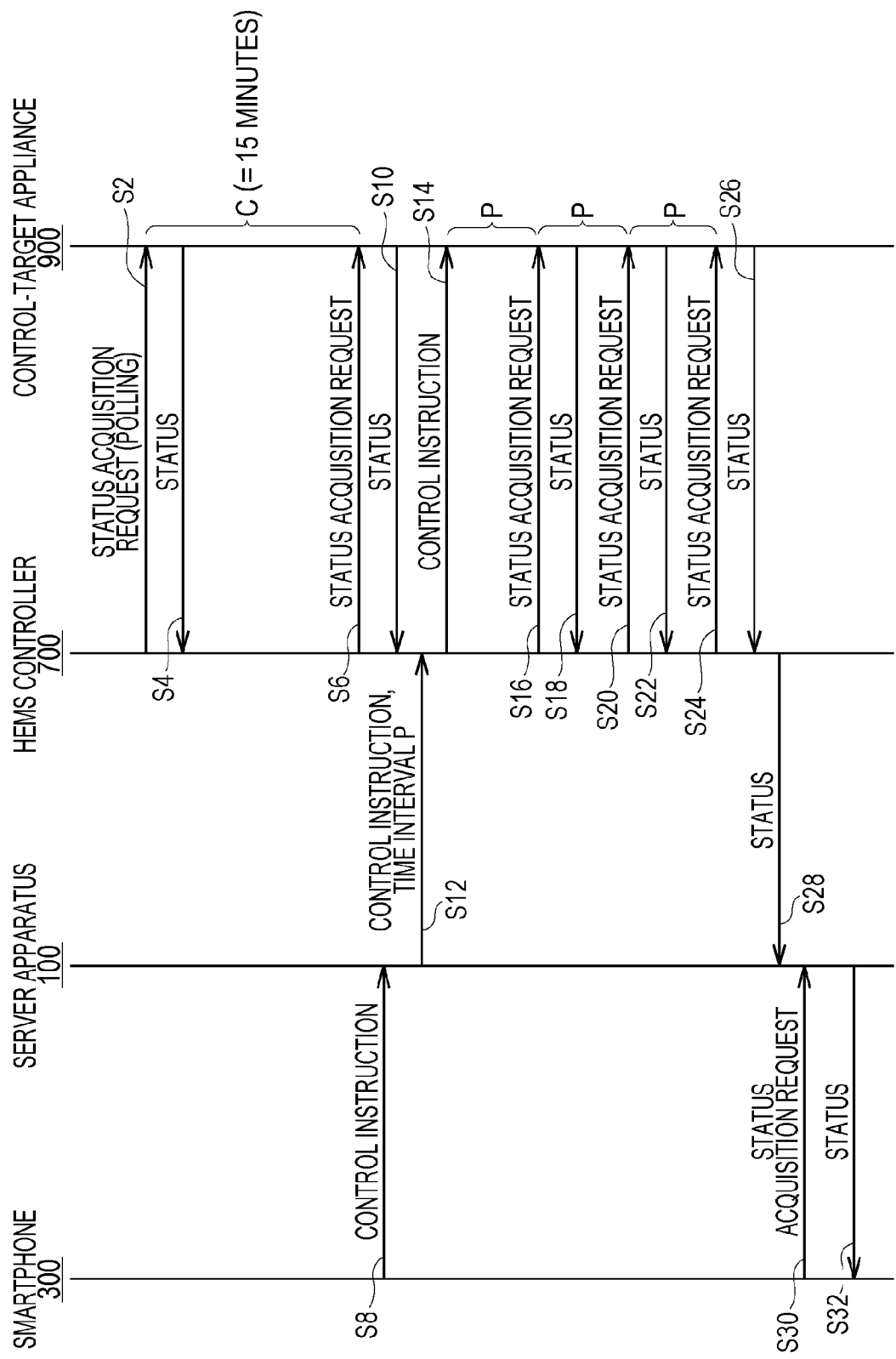
FIG. 4 is a sequence diagram for describing the flow of processing performed in the communication system according to the first embodiment.

FIG. 4 is a sequence diagram for describing the flow of processing performed in the communication system 1. Hereinafter, like the description given above with reference to FIG. 3, a description will be given by focusing on one control-target appliance 900 to which the user of the smartphone 300 will transmit a control instruction among the plurality of control-target appliances 900.

In step S2, the HEMS controller 700 transmits a status acquisition request to the control-target appliance 900 (for example, the air conditioner 901). In step S4, the control-target appliance 900 that has received the status acquisition request notifies the HEMS controller 700 of the current status of the control-target appliance 900.

After the time interval C (fifteen minutes) has elapsed following the transmission of the status acquisition request in step S2, the HEMS controller 700 transmits a status acquisition request (polling) to the control-target appliance 900 in step S6. In step S10, the control-target appliance 900 that has received the status acquisition request notifies the HEMS controller 700 of the current status of the control-target appliance 900.

In step S8, the smartphone 300 transmits, to the server apparatus 100, a control instruction directed to the control-target appliance 900 in response to a user operation. For example, the smartphone 300 transmits, to the server apparatus 100, a control instruction to set the to-be-set temperature of the air conditioner 901 to 24° C.

In step S12, the server apparatus 100 transmits, to the HEMS controller 700, the control instruction received from the smartphone 300 and information representing the time interval P (in the database 20) for the control-target appliance 900 to which the control instruction is to be transmitted. For example, the server apparatus 100 transmits, to the HEMS controller 700, the control instruction to set the to-be-set temperature of the air conditioner 901 to 24° C. and information representing the time interval P (five seconds) associated with the air conditioner 901 in the database 20.

In step S14, the HEMS controller 700 transmits, to the control-target appliance 900, the control instruction received from the server apparatus 100. After the time interval P (five seconds) has elapsed (more correctly, after the time period indicated by the time interval P has elapsed) following the transmission of the control instruction, the HEMS controller 700 transmits a status acquisition request to the control-target appliance 900 in step S16. In step S18, the control-target appliance 900 that has received the status acquisition request notifies the HEMS controller 700 of the current status of the control-target appliance 900.

If the HEMS controller 700 determines that the status of the control-target appliance 900 has not changed by the time that the time interval P (five seconds) has elapsed following the transmission of the status acquisition request in step S16, the HEMS controller 700 transmits a status acquisition request to the control-target appliance 900 in step S20. In step S22, the control-target appliance 900 that has received the status acquisition request notifies the HEMS controller 700 of the current status of the control-target appliance 900.

If the HEMS controller 700 determines that the status of the control-target appliance 900 has not changed by the time that the time interval P (five seconds) has elapsed following the transmission of the status acquisition request in step S20, the HEMS controller 700 transmits a status acquisition request to the control-target appliance 900 in step S24. In step S26, the control-target appliance 900 that has received the status acquisition request notifies the HEMS controller 700 of the current status of the control-target appliance 900.

If the HEMS controller 700 determines that the status of the control-target appliance 900 has changed by the time that the time interval P (five seconds) has elapsed following the transmission of the status acquisition request in step S24, the HEMS controller 700 transmits, in step S28, status information received from the control-target appliance 900 in step S26. In step S30, the smartphone 300 transmits a status acquisition request to the server apparatus 100. In step S32, the server apparatus 100 transmits information representing the changed status of the control-target appliance 900 to the smartphone 300.

If a status acquisition request is transmitted from the smartphone 300 to the server apparatus 100 before step S28 is performed, the server apparatus 100 does not receive, from the HEMS controller 700, information representing the status of the control-target appliance 900 as a transmission destination of a control instruction after the control instruction has been transmitted. Thus, the server apparatus 100 does not notify the smartphone 300 of the status. In this case, the server apparatus 100 transmits, for example, a signal stating "information representing the status has not been acquired" to the smartphone 300.

Figure 5:
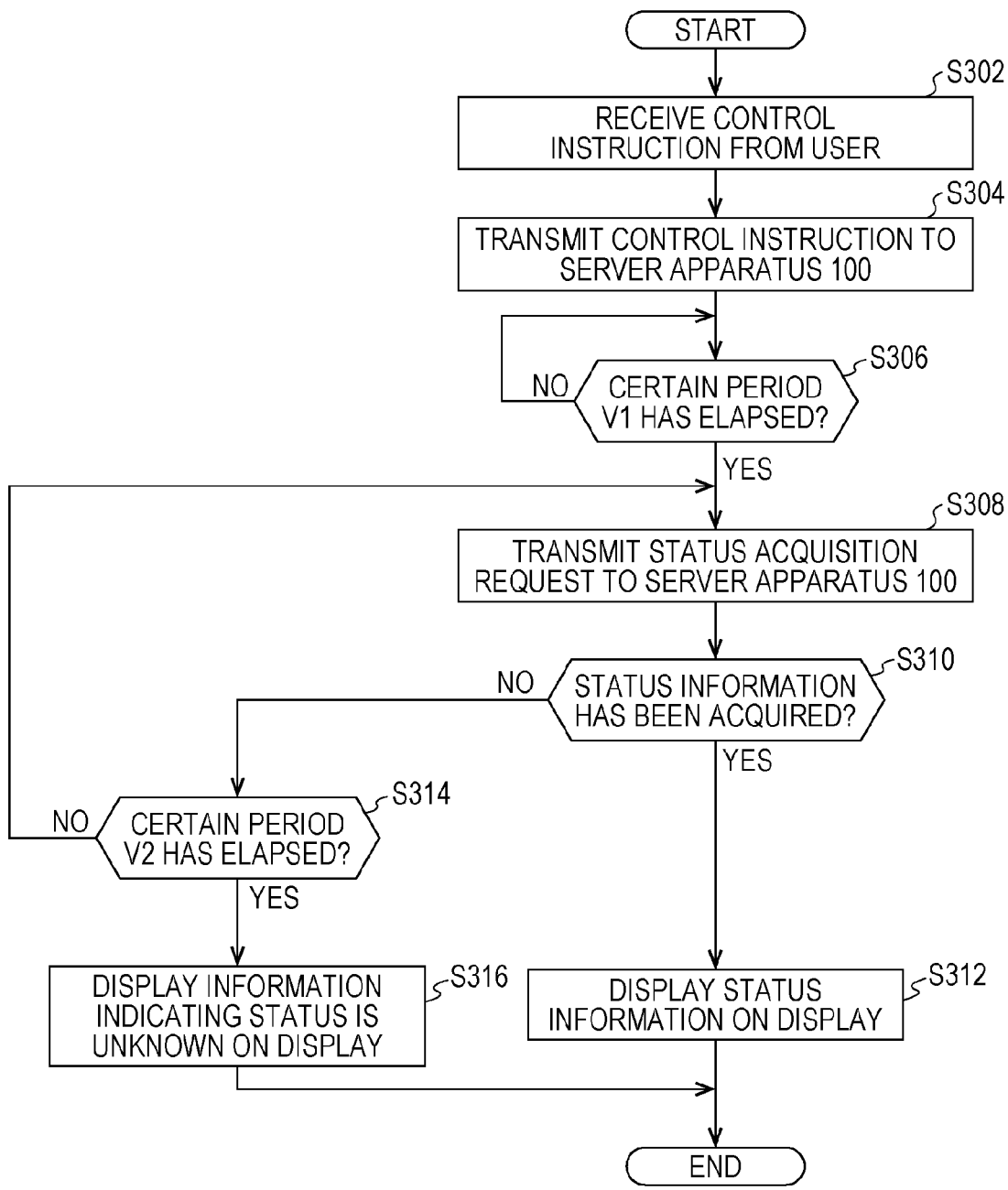
FIG. 5 is a flowchart for describing the flow of processing performed by a smartphone according to the first embodiment.

FIG. 5 is a flowchart for describing the flow of processing performed by the smartphone 300. The processing illustrated in FIG. 5 is implemented when a central processing unit (CPU) 315 (described below) of the smartphone 300 executes a program. Alternatively, part of the processing or the entire processing may be performed by a circuit element or another hardware unit.

Referring to FIG. 5, in step S302, the smartphone 300 receives, from the user, a control instruction directed to each control-target appliance 900. In step S304, the smartphone 300 transmits the received control instruction to the server apparatus 100. Step S304 corresponds to step S8 in FIG. 4.

In step S306, the smartphone 300 determines whether or not a certain period V1 has elapsed. If it is determined that the certain period V1 has elapsed (YES in step S306), the smartphone 300 transmits a status acquisition request to the server apparatus 100 in step S308. Step S308 corresponds to step S30 in FIG. 4. If it is determined that the certain period V1 has not elapsed (NO in step S306), the processing returns to step S306.

In step S310, the smartphone 300 determines whether or not information representing the status of the control-target appliance 900 has been acquired from the server apparatus 100. If it is determined that information representing the status has been acquired (YES in step S310), the smartphone 300 displays the acquired information (the information representing the status after processing has been performed in response to the control instruction) on a display in step S312. If it is determined that information representing the status has not been acquired (NO in step S310), the smartphone 300 determines in step S314 whether or not a certain period V2 has elapsed following the transmission of the status acquisition request in step S308.

If it is determined that the certain period V2 has elapsed (YES in step S314), the smartphone 300 displays, on the display, information indicating that information representing the status of the control-target appliance 900 as the transmission destination of the control instruction has not been acquired and that the status of the control-target appliance 900 is not known in step S316. If it is determined that the certain period V2 has not elapsed (NO in step S314), the processing returns to step S308.

Figure 6:
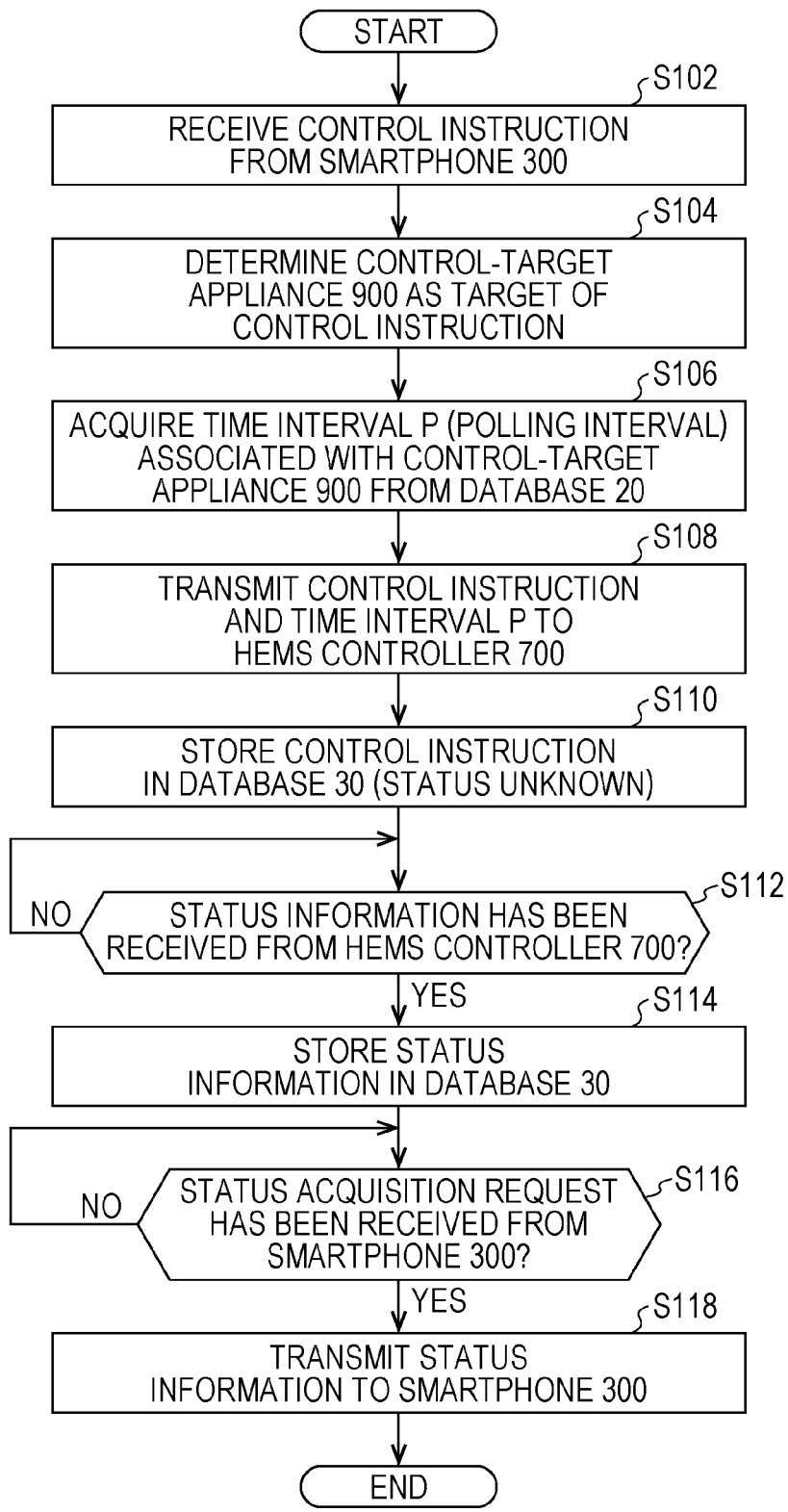
FIG. 6 is a flowchart for describing the flow of processing performed by the server apparatus according to the first embodiment.

FIG. 6 is a flowchart for describing the flow of processing performed by the server apparatus 100. The processing illustrated in FIG. 6 is implemented when a CPU 151 (described below) of the server apparatus 100 executes a program. Alternatively, part of the processing or the entire processing may be performed by a circuit element or another hardware unit. The same applies to an embodiment described below (specifically, the processing illustrated in FIG. 19).

Referring to FIG. 6, in step S102, the server apparatus 100 receives a control instruction from the smartphone 300. In step S104, the server apparatus 100 determines the control-target appliance 900 as a target of the received control instruction among the plurality of control-target appliances 900. The control instruction includes identification information for identifying the control-target appliance 900, and the server apparatus 100 performs the determination by using the identification information.

In step S106, the server apparatus 100 acquires, from the database 20, information representing the time interval P (polling interval) associated with the control-target appliance 900 as the transmission destination of the control instruction. In step S108, the server apparatus 100 transmits the control instruction received from the smartphone 300 and the information representing the time interval P read from the database 20 to the HEMS controller 700. Step S108 corresponds to step S12 in FIG. 4.

In step S110, the server apparatus 100 stores the control instruction in the column "received latest control instruction" in the database 30 in association with the control-target appliance 900 as the transmission destination of the control instruction. At the stage of the storage, the server apparatus 100 stores a message "status unknown" in the column "status" of the database 30.

In step S112, the server apparatus 100 determines whether or not the server apparatus 100 has received status information from the HEMS controller 700. If it is determined that the server apparatus 100 has received status information (YES in step S112), the server apparatus 100 stores the received status information in the column "status" of the database 30 in step S114. If it is determined that the server apparatus 100 has not received status information (NO in step S112), the processing returns to step S112.

In step S116, the server apparatus 100 determines whether or not the server apparatus 100 has received a status acquisition request from the smartphone 300. If it is determined that the server apparatus 100 has received a status acquisition request (YES in step S116), the server apparatus 100 refers to the database 30 and transmits, to the smartphone 300, information representing the status of the control-target appliance 900 received via the HEMS controller 700 in step S118.

Figure 7:
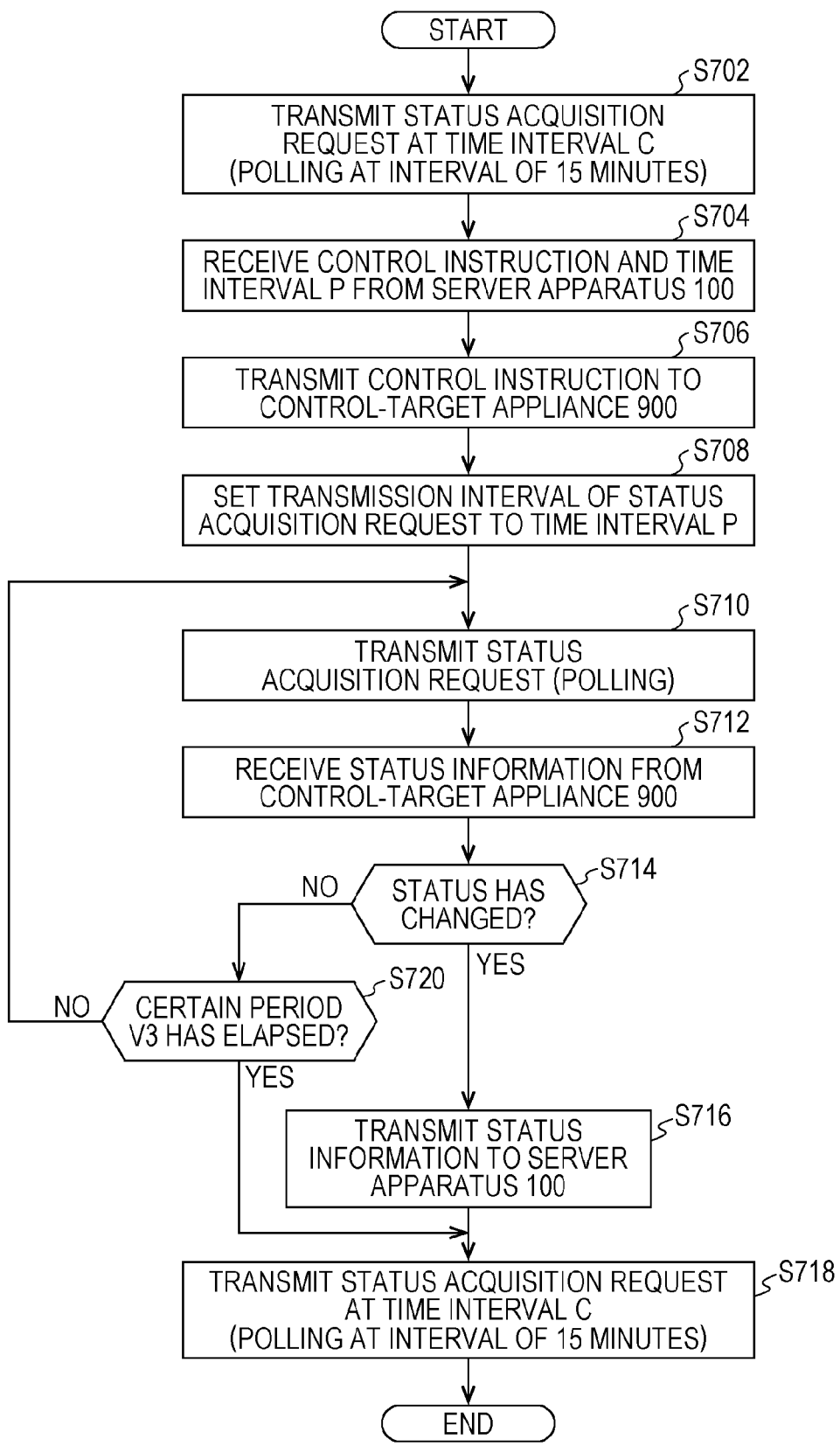
FIG. 7 is a flowchart for describing the flow of processing performed by a HEMS controller according to the first embodiment.

FIG. 7 is a flowchart for describing the flow of processing performed by the HEMS controller 700. The processing illustrated in FIG. 7 is implemented when a CPU 1101 (described below) of the HEMS controller 700 executes a program. Alternatively, part of the processing or the entire processing may be performed by a circuit element or another hardware unit. The same applies to embodiments described below (specifically, the processing illustrated in FIG. 15 and the processing illustrated in FIG. 18).

Referring to FIG. 7, in step S702, the HEMS controller 700 transmits a status acquisition request to each control-target appliance 900 at the time interval C (fifteen minutes). That is, the HEMS controller 700 performs transmission of a request signal (polling) for acquiring information representing the status of each control-target appliance 900 at the time interval C.

In step S704, the HEMS controller 700 receives a control instruction and information representing a time interval P from the server apparatus 100. In step S706, the HEMS controller 700 transmits the control instruction to the control-target appliance 900 as a transmission destination of the control instruction. For example, in a case where the control instruction input to the smartphone 300 is an instruction directed to the air conditioner 901, the HEMS controller 700 transmits the control instruction to the air conditioner 901. Step S704 corresponds to step S14 in FIG. 4.

In step S708, the HEMS controller 700 refers to the database 20 and sets the transmission interval of a status acquisition request to the time interval P. That is, the HEMS controller 700 changes the transmission interval of a status acquisition request that is to be transmitted to the control-target appliance 900 as the transmission destination of the control instruction from the time interval C (fifteen minutes) to the time interval P. For example, in a case where the control-target appliance 900 as the transmission destination of the control instruction is the air conditioner 901, the HEMS controller 700 refers to the time interval P associated with the air conditioner 901 in the database 20, and changes the transmission interval of a status acquisition request for the air conditioner 901 from the time interval C (fifteen minutes) to five seconds.

In step S710, the HEMS controller 700 transmits a status acquisition request at the set time interval P. Specifically, in step S710, the HEMS controller 700 transmits a status acquisition request once. In step S712, the HEMS controller 700 receives status information from the control-target appliance 900 as the transmission destination of the control instruction.

In step S714, the HEMS controller 700 determines, with reference to the received status information and the status information stored in the database 30, whether or not the status of the control-target appliance 900 as the destination of the control instruction has changed. If it is determined that the status has changed (YES in step S714), the HEMS controller 700 transmits the received status information (information representing the changed status) to the server apparatus 100 in step S716. Step S716 corresponds to step S28 in FIG. 4.

If it is determined that the status has not changed (NO in step S714), the HEMS controller 700 determines in step S720 whether or not a certain period V3 has elapsed following the transmission of the status acquisition request in step S710. If it is determined that the certain period V3 has elapsed (YES in step S720), the processing proceeds to step S718. If it is determined that the certain period V3 has not elapsed (NO in step S720), the processing returns to step S710.

In step S718, the HEMS controller 700 sets the transmission interval of a status acquisition request to the time interval C (fifteen minutes), and repeats the transmission of a status acquisition request at the time interval C. That is, the HEMS controller 700 changes the transmission interval of a status acquisition request to be transmitted to the control-target appliance 900 as the transmission destination of the control instruction from the time interval P to the time interval C of ordinary setting, and repeats the transmission of a status acquisition request at the time interval C.

Figure 8:
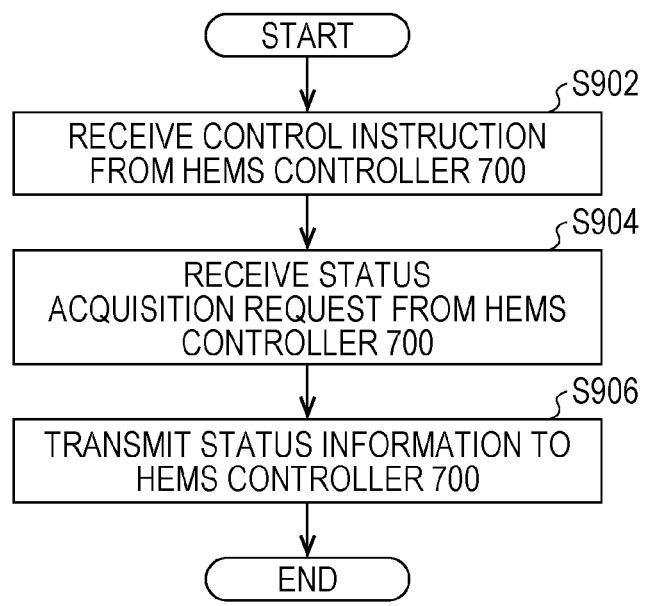
FIG. 8 is a flowchart for describing the flow of processing performed by a control-target appliance according to the first embodiment.

FIG. 8 is a flowchart for describing the flow of processing performed by the control-target appliance 900. The processing illustrated in FIG. 8 is implemented when a CPU (not illustrated) of the control-target appliance 900 executes a program. Alternatively, part of the processing or the entire processing may be performed by a circuit element or another hardware unit.

Referring to FIG. 8, in step S902, the control-target appliance 900 receives a control instruction from the HEMS controller 700. In step S904, the control-target appliance 900 that has received the control instruction receives a status acquisition request from the HEMS controller 700. Further, in step S906, the control-target appliance 900 that has received the control instruction transmits status information to the HEMS controller 700. Step S906 corresponds to step S26 in FIG. 4.

D. Functional Configuration

Figure 9:
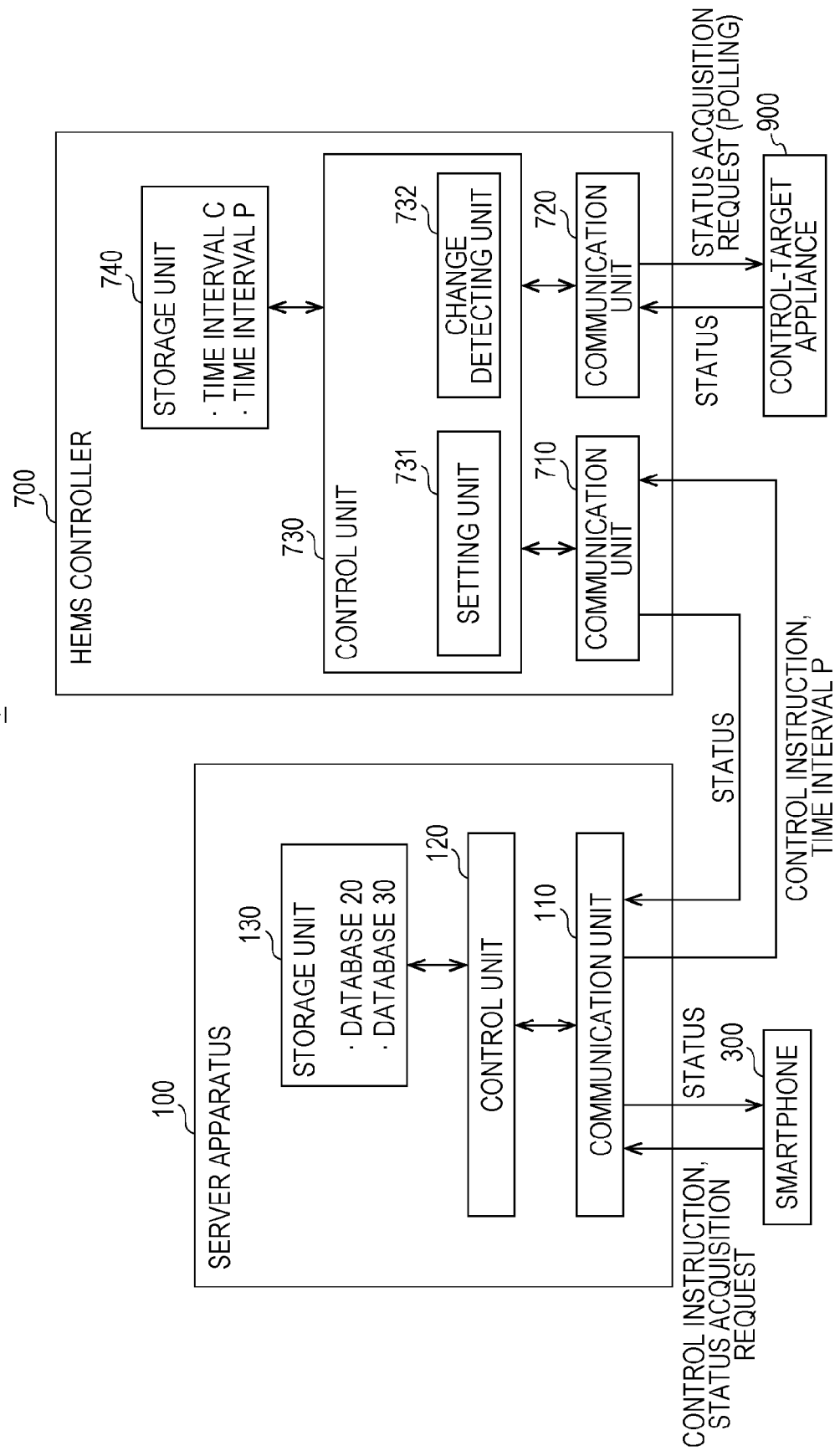
FIG. 9 is a functional block diagram for describing the functional configurations of the server apparatus and the HEMS controller according to the first embodiment.

FIG. 9 is a functional block diagram for describing the functional configurations of the server apparatus 100 and the HEMS controller 700. Referring to FIG. 9, the server apparatus 100 includes a communication unit 110, a control unit 120, and a storage unit 130. The HEMS controller 700 includes a communication unit 710, a communication unit 720, a control unit 730, and a storage unit 740. The control unit 730 includes a setting unit 731 and a change detecting unit 732.

The communication unit 110 has a function of communicating with the smartphone 300 and the HEMS controller 700. The control unit 120 controls the operation of the server apparatus 100. The storage unit 130 stores various programs and data, such as an operating system, an application program, the database 20, and the database 30.

The communication unit 710 has a function of communicating with the server apparatus 100. The communication unit 720 has a function of communicating with the individual control-target appliances 900. The control unit 730 controls the operation of the HEMS controller 700. The storage unit 740 stores various programs and data, such as an operating system, an application program, and information representing the time interval C. When a notification about a time interval P is received from the server apparatus 100, the storage unit 740 temporarily stores information representing the time interval P.

(1) HEMS Controller 700

The communication unit 720 repeatedly transmits a status acquisition request to a control-target appliance 900 at a set time interval in order to detect a change in the status of the control-target appliance 900. The change detecting unit 732 compares information representing the current status of the control-target appliance 900 with the previously obtained information representing the status of the control-target appliance 900, and thereby detects whether or not the status of the control-target appliance 900 has changed. If it is detected that the status of the control-target appliance 900 has changed, the communication unit 710 notifies the smartphone 300 of the changed status via the server apparatus 100. The setting unit 731 sets a time interval of transmitting a status acquisition request.

In a state where the time interval is set to the time interval C by the setting unit 731, in a case where the communication unit 710 receives a control instruction for controlling the operation of the control-target appliance 900 from the smartphone 300 via the server apparatus 100, the communication unit 720 transmits the control instruction to the control-target appliance 900. In response to the transmission of the control instruction to the control-target appliance 900, the setting unit 731 makes the time interval shorter than the time interval C.

With the above-described configuration, the smartphone 300 is able to quickly receive information representing a change in the status of the control-target appliance 900 caused by a control instruction.

More specifically, the setting unit 731 sets the time interval to the time interval P shorter than the time interval C in response to the transmission of the control instruction to the control-target appliance 900. The time interval P differs between a case where the control instruction is directed to a first control-target appliance (for example, the air conditioner 901) and a case where the control instruction is directed to a second control-target appliance (for example, the electric shutter 903).

With the above-described configuration, the transmission interval of a status acquisition request can be changed to a time interval determined for each control-target appliance 900. Accordingly, the number of transmissions of an unnecessary status acquisition request can be reduced, compared to the case of uniformly changing the transmission interval of a status acquisition request for all the control-target appliances 900.

The communication units 710 and 720 correspond to a high-speed communication interface (IF) 1104 (described below). The control unit 730 including the setting unit 731 and the change detecting unit 732 is implemented when the CPU 1101 (described below) executes a certain program. The storage unit 740 corresponds to a memory 1110 (described below). The same applies to HEMS controllers 700A, 700B, and 700C according to the individual embodiments described below.

(2) Server Apparatus 100

The server apparatus 100 stores the database 20 in which pieces of identification information about the control-target appliances 900 are associated with respective time intervals P. In response to receipt of a control instruction directed to a first control-target appliance from the smartphone 300, the server apparatus 100 notifies the HEMS controller 700 of the time interval P associated with the identification information about the first control-target appliance with reference to the database 20.

With the above-described configuration, the HEMS controller 700 is able to know the time interval P for the first control-target appliance. Further, with the above-described configuration, it is not necessary to store the database 20 in the HEMS controller 700 that is installed in each building. Thus, in a case where a service provider (for example, an operator of the server apparatus 100) wants to change the transmission interval of a status acquisition request, the service provider only has to change the database 20 of the server apparatus 100. Accordingly, efforts of management performed by the service provider can be reduced.

The communication unit 110 corresponds to a communication IF 157 (described below). The control unit 120 is implemented when the CPU 151 (described below) executes a certain program. The storage unit 130 corresponds to a read only memory (ROM) 152, a random access memory (RAM) 153, and a hard disk drive (HDD) 154 (described below). The same applies to server apparatuses 100A, 100B, and 100C according to the individual embodiments described below.

E. Hardware Configuration
e1. Server Apparatus 100

Figure 10:
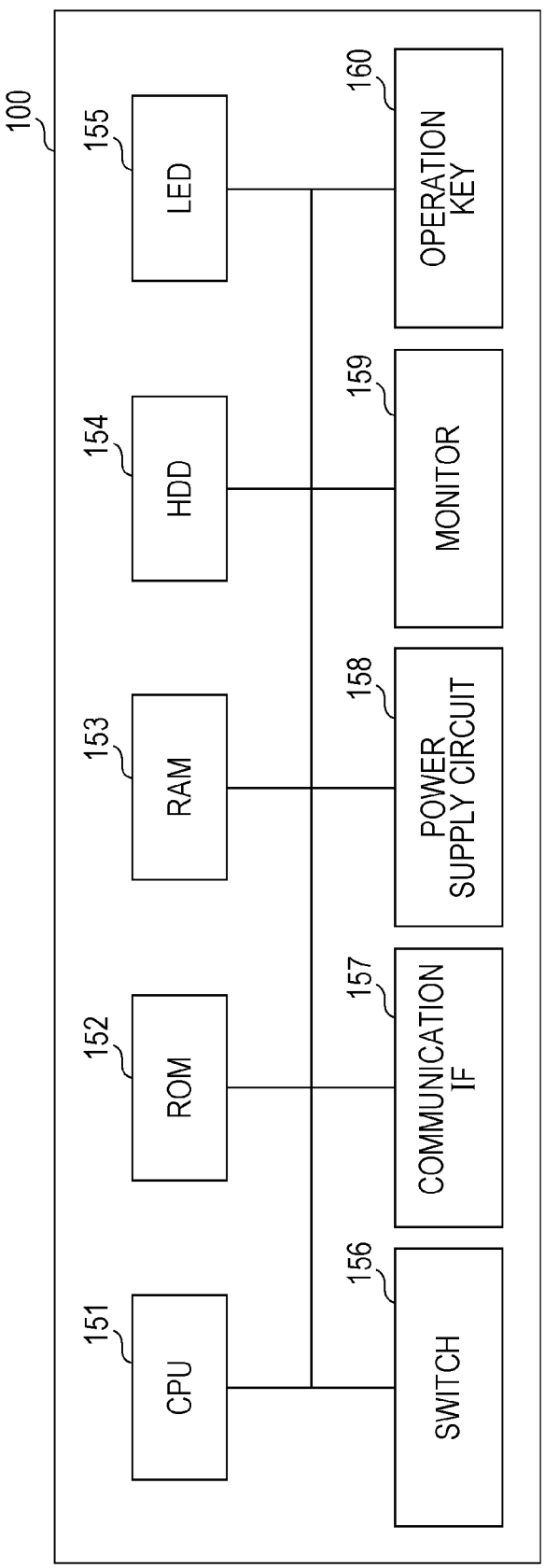
FIG. 10 is a diagram illustrating a typical example of the hardware configuration of the server apparatus according to the first embodiment.

FIG. 10 is a diagram illustrating a typical example of the hardware configuration of the server apparatus 100. Referring to FIG. 10, the server apparatus 100 includes, as its components, the CPU 151 that executes a program, the ROM 152 that stores data in a nonvolatile manner, the RAM 153 that stores data generated through a program executed by the CPU 151 or data input via an input device (not illustrated) in a volatile manner, the HDD 154 that stores data in a nonvolatile manner, a light-emitting diode (LED) 155, a switch 156, the communication IF 157, a power supply circuit 158, a monitor 159, and an operation key 160. The individual components are connected to one another via a data bus.

The power supply circuit 158 is a circuit that reduces the voltage of a commercial power received via an outlet and supplies the power to the individual devices of the server apparatus 100. The switch 156 functions as a main power switch for switching whether or not to supply power to the power supply circuit 158, and other various push-button switches. The monitor 159 is a device for displaying various data.

The communication IF 157 performs processing of transmitting data to the HEMS controller 700, processing of receiving data from the HEMS controller 700, processing of transmitting data to the smartphone 300, and processing of receiving data from the smartphone 300.

The LED 155 is a display lamp of various types representing an operation status of the server apparatus 100. For example, the LED 155 represents an ON- or OFF-state of the main power of the server apparatus 100, and a reading or writing state for the HDD 154. The operation key 160 is a key (keyboard) used by the user of the server apparatus 100 to input data into the server apparatus 100.

The processing in the server apparatus 100 is implemented by each hardware unit and the software executed by the CPU 151. Such software may be stored in the HDD 154 in advance. The software may be stored in another storage medium and circulated as a program product. Alternatively, the software may be provided as a downloadable program product by an information provider connected to the Internet. The software is read from the storage medium by a reading device or is downloaded via the communication IF 157 or the like, and is then once stored in the HDD 154. The software is then read from the HDD 154 by the CPU 151 and is stored in the RAM 153 in the form of an executable program. The CPU 151 executes the program.

The individual components included in the server apparatus 100 illustrated in FIG. 10 are general devices. Thus, an embodiment of the present disclosure may also be implemented by software stored in the RAM 153, HDD 154, or another storage medium, or software downloadable via a network. The operation of each hardware unit of the server apparatus 100 is known, and thus the detailed description thereof is omitted here.

A recording medium is not limited to a DVD-RAM, and any other media that store a program in a fixed manner may be used, for example, a DVD-ROM, a CD-ROM, an FD, a hard disk, a magnetic tape, a cassette tape, an optical disc, an EEPROM, and a semiconductor memory such as a flash ROM. The recording medium is a non-transitory medium from which the program is readable by a computer. Here, the program includes not only a program that is directly executable by a CPU but also a program in a source program format, a compressed program, and an encrypted program.

e2. HEMS Controller 700

Figure 11:
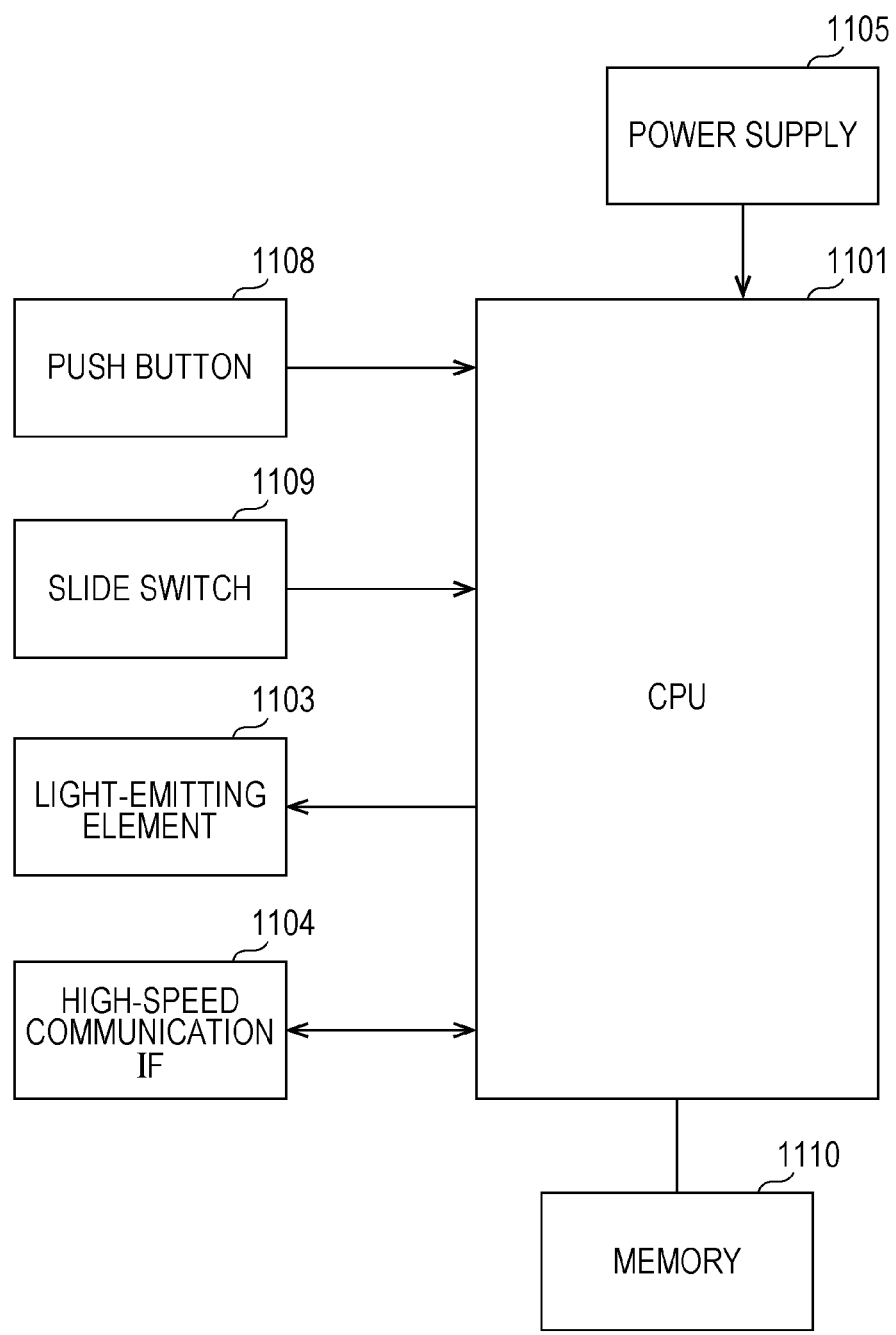
FIG. 11 is a block diagram of the HEMS controller according to the first embodiment.

FIG. 11 is a block diagram of the HEMS controller 700. Referring to FIG. 11, the HEMS controller 700 includes the CPU 1101, a light-emitting element 1103, the high-speed communication IF 1104, a power supply 1105, a push button 1108, a slide switch 1109, the memory 1110, and a reset switch (not illustrated).

The high-speed communication IF 1104 is an interface for performing communication using Ethernet (registered trademark) with the broadband router 600. The power supply 1105 supplies power to the CPU 1101. The memory 1110 stores an operating system, various application programs, and various data. The memory 1110 is typically constituted by a ROM and/or a nonvolatile flash memory.

The CPU 1101 is connected to the light-emitting element 1103, the high-speed communication IF 1104, the power supply 1105, the push button 1108, and the slide switch 1109. The CPU 1101 controls the entire operation of the HEMS controller 700. The CPU 1101 receives input from the push button 1108 and the slide switch 1109. Also, the CPU 1101 outputs an output instruction to the light-emitting element 1103.

e3. Smartphone 300

Figure 12:
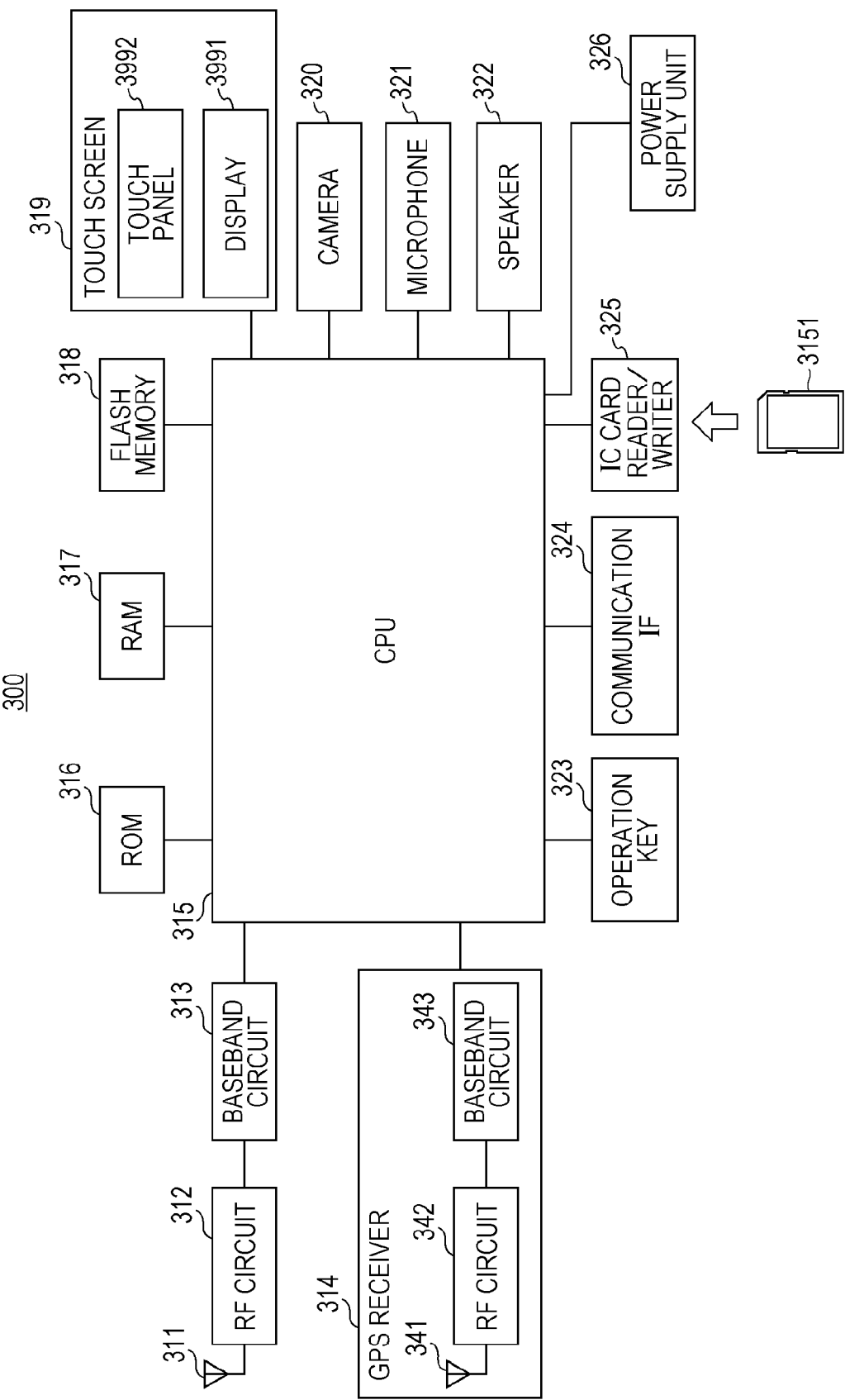
FIG. 12 is a diagram illustrating the hardware configuration of the smartphone according to the first embodiment.

FIG. 12 is a diagram illustrating the hardware configuration of the smartphone 300. Referring to FIG. 12, the smartphone 300 includes an antenna 311, a radio frequency (RF) circuit 312, a baseband circuit 313, a global positioning system (GPS) receiver 314, the CPU 315 that executes a program, a ROM 316, a RAM 317, a flash memory 318 of a NAND type, a touch screen 319, a camera 320, a microphone 321, a speaker 322, an operation key 323 that receives input of an instruction from the user, a communication IF 324, an integrated circuit (IC) card reader/writer 325, and a power supply unit 326. The touch screen 319 includes a display 3991 and a touch panel 3992.

The GPS receiver 314 includes an antenna 341, an RF circuit 342, and a baseband circuit 343. The GPS receiver 314 receives a signal of a GPS satellite by using the antenna 341. Further, the GPS receiver 314 outputs a result of processing performed by the RF circuit 342 and the baseband circuit 343 (that is, current location information) to the CPU 315. The current location information is information representing latitude, longitude, and altitude.

The antenna 311, the RF circuit 312, and the baseband circuit 313 are used for wireless communication with another mobile terminal, a fixed telephone, or a personal computer (PC) via a base station. Specifically, the antenna 311, the RF circuit 312, and the baseband circuit 313 are used by the smartphone 300 to perform communication using a mobile telephone network.

The flash memory 318 is a nonvolatile semiconductor memory. The flash memory 318 stores, in a nonvolatile manner, various programs for controlling the smartphone 300 and various data, such as data generated by the smartphone 300 and data acquired from an external apparatus of the smartphone 300.

The individual components 311 to 343 are connected to one another via a data bus. A memory card 3151 is loaded into the IC card reader/writer 325.

The processing in the smartphone 300 is implemented by each hardware unit and the software executed by the CPU 315. Such software may be stored in the flash memory 318 in advance. The software may be stored in the memory card 3151 or another storage medium and circulated as a program product. Alternatively, the software may be provided as a downloadable program product by an information provider connected to the Internet. The software is read from the storage medium by the IC card reader/writer 325 or another reading device or is downloaded via the antenna 311, the RF circuit 312, and the baseband circuit 313, or the communication IF 324, and is then once stored in the flash memory 318. The software is then read from the flash memory 318 by the CPU 315 and is stored in the RAM 317 in the form of an executable program. The CPU 315 executes the program.

The individual components included in the smartphone 300 illustrated in FIG. 12 are general devices. Thus, an embodiment of the present disclosure may also be implemented by software stored in the flash memory 318, the memory card 3151, or another storage medium, or software downloadable via a network. The operation of each hardware unit of the smartphone 300 is known, and thus the detailed description thereof is omitted here.

A recording medium is not limited to a DVD-ROM, a CD-ROM, an FD, and a hard disk, and any other media that store a program in a fixed manner may be used, for example, a magnetic tape, a cassette tape, an optical disc, an optical card, a mask ROM, an EPROM, an EEPROM, and a semiconductor memory such as a flash ROM. The recording medium is a non-transitory medium from which the program is readable by a computer. Here, the program includes not only a program that is directly executable by a CPU but also a program in a source program format, a compressed program, and an encrypted program.

The program for implementing various processing operations according to this embodiment may be provided as a part of a certain program, not as an independent program. In this case, the program cooperates with the certain program to implement the processing according to this embodiment. Such a program that does not include some modules does not deviate from the gist of the communication system 1 according to this embodiment (particularly the server apparatus 100, the HEMS controller 700, and the smartphone 300). Further, some or all of the functions provided by the program according to this embodiment may be implemented by dedicated hardware. The same applies to the embodiments described below.

Second Embodiment

The communication system 1 according to a second embodiment has the same system configuration as that of the first embodiment (FIG. 1). Hereinafter, the server apparatus and the HEMS controller of the communication system 1 according to this embodiment are referred to as a "server apparatus 100A" and a "HEMS controller 700A" for the convenience of description.

In the first embodiment, as described above with reference to FIG. 2A illustrating the database 20, one time interval P is set for each control-target appliance 900 regardless of the type of control instruction. In the second embodiment, a time interval P can be set in accordance with the type of control instruction.

Figures 13, 14:
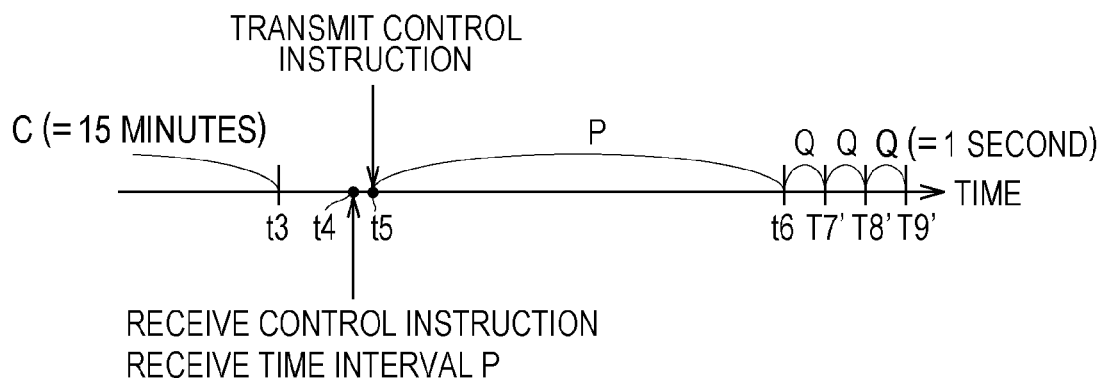
FIG. 13 is a diagram illustrating the schematic configuration of a database stored in a server apparatus according to a second embodiment of the present disclosure.
FIG. 14 is a diagram for describing the overview of processing performed in a communication system according to a third embodiment of the present disclosure.

FIG. 13 is a diagram illustrating the schematic configuration of a database 20A stored in the server apparatus 100A instead of the database 20 (FIG. 2A). Referring to FIG. 13, the database 20A specifies, for the individual control-target appliances 900 (specifically, for the individual pieces of identification information about the control-target appliances 900), transmission intervals (time intervals P) of polling set for the individual types of control instructions.

For the air conditioner 901, a time interval P of two seconds is set for a control instruction to turn on or off the power. Further, for the air conditioner 901, a time interval P of five seconds is set for a control instruction other than the control instruction to turn on or off the power.

For the air cleaner 902, a time interval P of five seconds is set for all the types of control instructions.

For the electric shutter 903, a time interval P of five seconds is set for a control instruction to set a timer operation. Also, for the electric shutter 903, a time interval P of fifteen seconds is set for a control instruction to set a shutter open/close operation. Further, for the electric shutter 903, a time interval P of ten seconds is set for a control instruction other than the control instruction to set a timer operation and the control instruction to set a shutter open/close operation.

The server apparatus 100A transmits, to the HEMS controller 700A, information representing a time interval P corresponding to the control-target appliance 900 as a transmission destination of a control instruction and the type of the control instruction, together with the control instruction. For example, in a case where a control instruction to turn on the power of the air conditioner 901 is input to the smartphone 300, the server apparatus 100 transmits the control instruction to turn on the power and information representing a time interval P of two seconds to the HEMS controller 700A.

The functional configuration of the server apparatus 100A according to this embodiment is different from the functional configuration of the server apparatus 100 according to the first embodiment (FIG. 9) in that the storage unit 130 includes the database 20A instead of the database 20. Also, the functional configuration of the server apparatus 100A according to this embodiment is different from the functional configuration of the server apparatus 100 according to the first embodiment in that the setting unit 731 causes the time interval P to differ between a case where the type of the control instruction directed to the control-target appliance 900 is a first type and a case where the type of the control instruction directed to the control-target appliance 900 is a second type.

With the above-described configuration, the transmission interval of a status acquisition request can be changed to a time interval that is determined for each control-target appliance 900 and each control instruction. Accordingly, the number of transmissions of an unnecessary status acquisition request can be reduced, compared to the case of uniformly changing the transmission interval of a status acquisition request for all the control instructions for one control-target appliance 900.

The server apparatus 100A stores the database 20A (FIG. 13) in which pieces of identification information about the control-target appliances 900, the types of control instructions, and time intervals P are associated with one another. In response to receipt of a first type of control instruction (for example, an instruction to turn on or off the power) directed to a first control-target appliance (for example, the air conditioner 901) from the smartphone 300, the server apparatus 100A notifies the HEMS controller 700A of the time interval P associated with the identification information about the first control-target appliance and the first type with reference to the database 20A.

With the above-described configuration, the HEMS controller 700A is able to know the time interval P for the first control-target appliance and for a certain type of control instruction. Further, with the above-described configuration, it is not necessary to store the database 20A in the HEMS controller 700A that is installed in each building. Thus, in a case where a service provider (for example, an operator of the server apparatus 100A) wants to change the transmission interval of a status acquisition request, the service provider only has to change the database 20A of the server apparatus 100A. Accordingly, efforts of management performed by the service provider can be reduced.

Third Embodiment

The communication system 1 according to a third embodiment has the same system configuration as that of the first embodiment (FIG. 1). Hereinafter, the server apparatus and the HEMS controller of the communication system 1 according to this embodiment are referred to as a "server apparatus 100B" and a "HEMS controller 700B" for the convenience of description.

In this embodiment, a description will be given of a configuration in which the HEMS controller 700B receives a control instruction, transmits once a status acquisition request to the control-target appliance 900 as the transmission destination of the control instruction at a time interval P, and then sequentially transmits a status acquisition request to the control-target appliance 900 at a time interval Q. In this embodiment, the server apparatus 100B stores the database 20 (FIG. 2A) as in the first embodiment.

F. Overview of Processing

Hereinafter, a description will be given by focusing on one control-target appliance 900 to which the user of the smartphone 300 will transmit a control instruction among the plurality of control-target appliances 900. For the convenience of description, it is assumed that the one control-target appliance 900 is, for example, the air conditioner 901, as in the first embodiment.

FIG. 14 is a diagram for describing the overview of processing performed in the communication system 1 according to this embodiment. Referring to FIG. 14, the HEMS controller 700B transmits a status acquisition request to the air conditioner 901 at a time interval C (for example, fifteen minutes), like the HEMS controller 700. Specifically, as illustrated in FIG. 3, the HEMS controller 700B transmits a status acquisition request to the air conditioner 901 at times t1, t2 (=t1+C), and t3 (=t2+C). In FIG. 14, times t1 and t2 are not illustrated for convenience.

The HEMS controller 700B receives a control instruction and information representing a time interval P for the air conditioner 901 ("five seconds" in FIG. 2A) from the server apparatus 100B at time t4 (<t3+C), and then transmits the control instruction to the air conditioner 901 at time t5. Also, the HEMS controller 700B sets the transmission interval of a status acquisition request to the time interval P (five seconds), which is shorter than the time interval C (fifteen minutes).

At time t6 (=t5+5 seconds), the HEMS controller 700B transmits a status acquisition request to the air conditioner 901. Further, the HEMS controller 700B sets the transmission interval of a status acquisition request to a time interval Q (in this embodiment, one second), which is shorter than the time interval P (five seconds). After this, the HEMS controller 700B transmits a status acquisition request to the air conditioner 901 at times t7' (=t6+1 second), t8' (=t7'+1 second), t9' (=t8'+1 second), . . . . When detecting a change in the status of the air conditioner 901, the HEMS controller 700B changes the transmission interval of a status acquisition request from the time interval Q to the time interval C.

Also in a case where the control-target appliance 900 to which a control instruction is to be transmitted is the air cleaner 902 or the electric shutter 903, the HEMS controller 700B transmits once a status acquisition request at the time interval P after the transmission of the control instruction, and then repeatedly transmits a status acquisition request at the time interval Q in the above-described manner.

G. Control Structure

Figure 15:
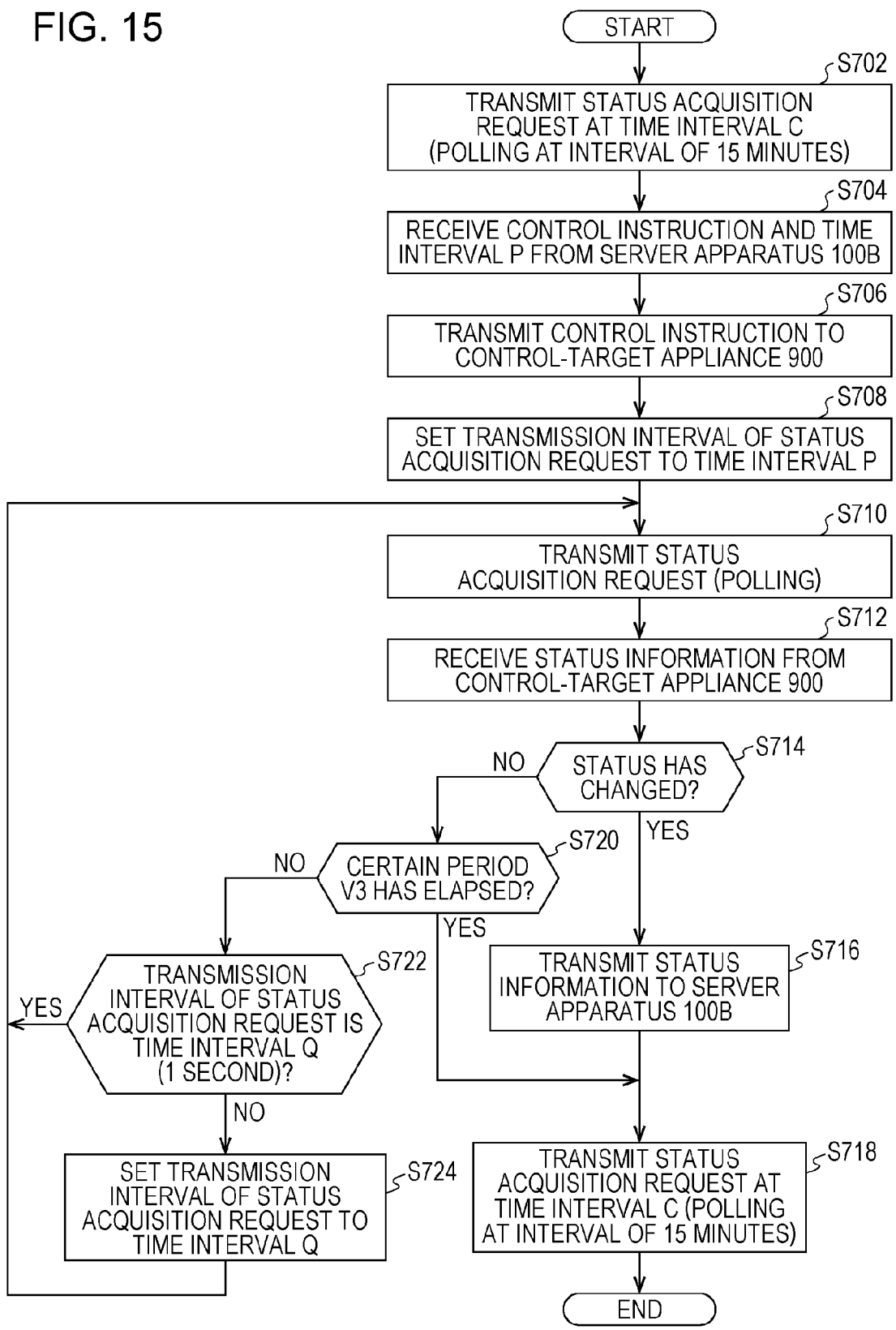
FIG. 15 is a flowchart for describing the flow of processing performed by a HEMS controller according to the third embodiment.

FIG. 15 is a flowchart for describing the flow of processing performed by the HEMS controller 700B. The flowchart illustrated in FIG. 15 is different from the flowchart illustrated in FIG. 7 in that steps S722 and S724 are included, the processing proceeds to step S722 if a negative determination is made in step S720, and the server apparatus 100 is replaced with the server apparatus 100B in steps S704 and S716. Thus, a description will be given of the points different from the flowchart illustrated in FIG. 7, and the description of the processing given above with reference to FIG. 7 is not repeated.

If a negative determination is made in step S720 (NO in step S720), the HEMS controller 700B determines in step S722 whether or not the transmission interval of a status acquisition request is the time interval Q. If it is determined that the transmission interval is not the time interval Q (NO in step S722), the HEMS controller 700B sets the transmission interval of a status acquisition request to the time interval Q in step S724. That is, the HEMS controller 700B changes the transmission interval of a status acquisition request from the time interval P to the time interval Q. If it is determined that the transmission interval is the time interval Q (YES in step S722), the processing returns to step S710.

H. Functional Configuration

Figure 16:
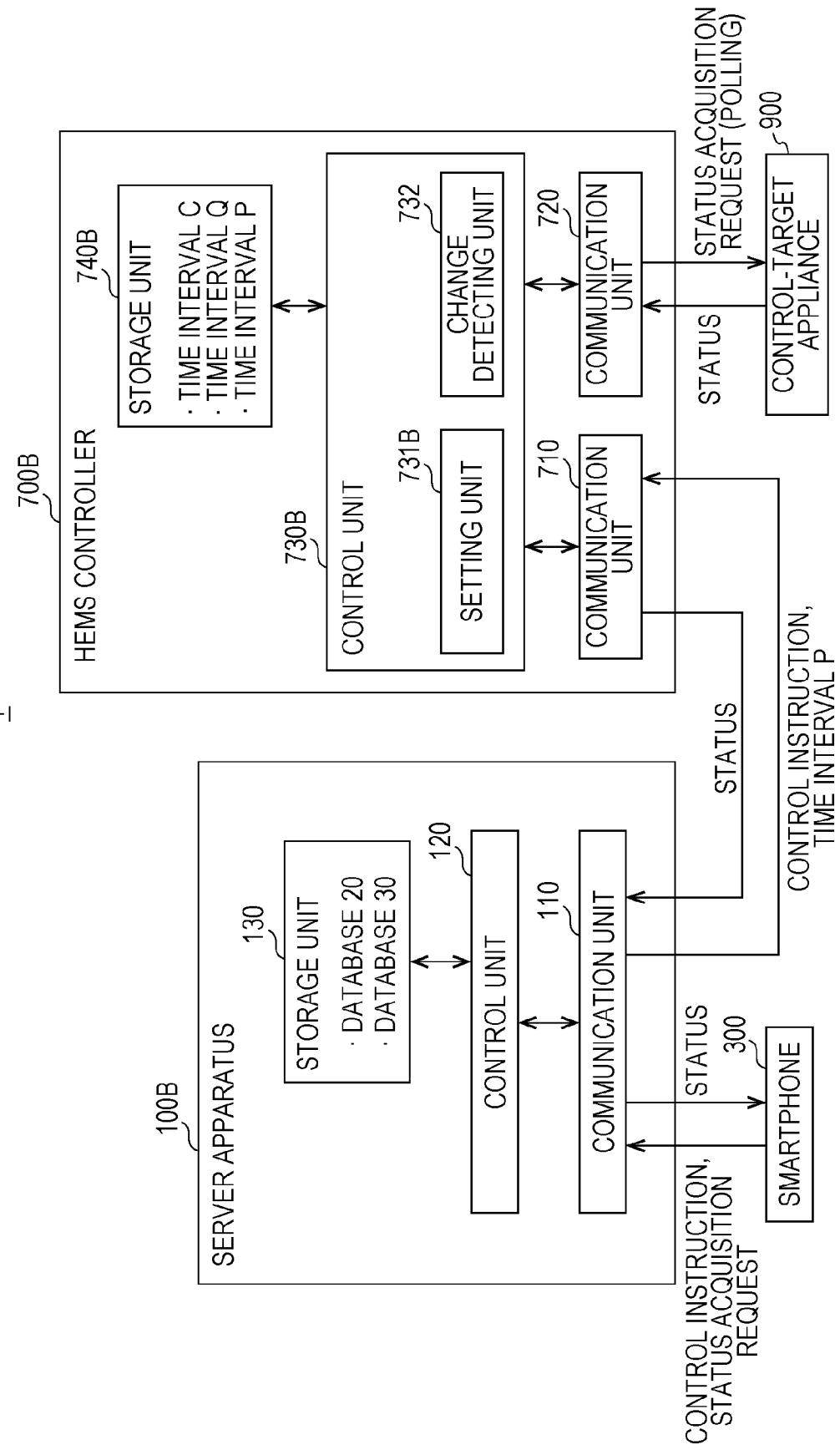
FIG. 16 is a functional block diagram for describing the functional configurations of a server apparatus and the HEMS controller according to the third embodiment.

FIG. 16 is a functional block diagram for describing the functional configurations of the server apparatus 100B and the HEMS controller 700B. Referring to FIG. 16, the server apparatus 100B includes the communication unit 110, the control unit 120, and the storage unit 130, like the server apparatus 100 (FIG. 9). Thus, the description of the server apparatus 100 is not repeated here.

The HEMS controller 700B includes the communication unit 710, the communication unit 720, a control unit 730B, and a storage unit 740B. The control unit 730B includes a setting unit 731B and the change detecting unit 732.

The setting unit 731B sets the time interval to the time interval P shorter than the time interval C in response to the transmission of a control instruction. The setting unit 731B sets the time interval to the time interval Q shorter than the time interval P in response to one transmission of a status acquisition request at the time interval P.

With the above-described configuration, the smartphone 300 is able to quickly know the status of the control-target appliance 900, compared to the configuration in which transmission of a status acquisition request is repeated at the time interval P.

Fourth Embodiment

The communication system 1 according to a fourth embodiment has the same system configuration as that of the first embodiment (FIG. 1). Hereinafter, the server apparatus and the HEMS controller of the communication system 1 according to this embodiment are referred to as a "server apparatus 100C" and a "HEMS controller 700C" for the convenience of description.

In this embodiment, a description will be given of a configuration that has a function of updating the value of a time interval P by using the number of transmissions of a status acquisition request, in addition to the functions according to the third embodiment. In the following description, a j-th time interval P is referred to as a time interval P (j), and a j+1-th time interval P is referred to as a time interval P (j+1). Here, "j" is a natural number of one or more. In this embodiment, as in the first and third embodiments, the server apparatus 100C stores the database 20 (FIG. 2A).

I. Overview of Processing

Hereinafter, a description will be given by focusing on one control-target appliance 900 to which the user of the smartphone 300 will transmit a control instruction among the plurality of control-target appliances 900. For the convenience of description, it is assumed that the one control-target appliance 900 is, for example, the air conditioner 901, as in the third embodiment. Hereinafter, a description will be given mainly of the points different from the third embodiment.

Figure 17:
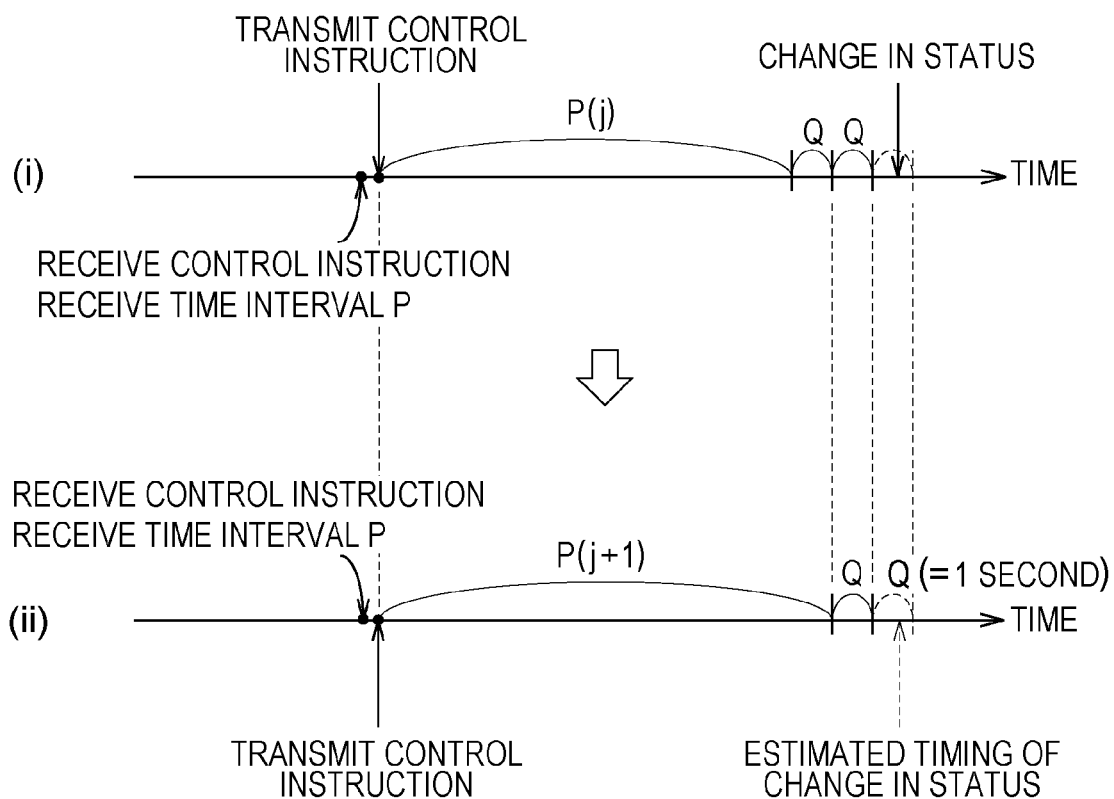
FIG. 17 is a diagram for describing the overview of processing performed in a communication system according to a fourth embodiment of the present disclosure.

FIG. 17 is a diagram for describing the overview of processing performed in the communication system 1 according to this embodiment. Referring to FIG. 17, a state (i) shows the timing to transmit a status acquisition request in response to the latest control instruction. A state (ii) shows the timing to transmit the next status acquisition request. That is, the state (i) shows the present result, and the state (ii) shows the next setting.

Referring to the state (i), immediately after receiving a control instruction and information representing the time interval P (j) for the air conditioner 901 from the server apparatus 100C, the HEMS controller 700C transmits the control instruction to the air conditioner 901. Also, the HEMS controller 700C sets the transmission interval of a status acquisition request to the time interval P (j).

After setting the transmission interval of a status acquisition request to the time interval P (j), the HEMS controller 700C transmits a status acquisition request to the air conditioner 901 only once, and then sets the transmission interval of a status acquisition request to the time interval Q (in this embodiment, one second). After this, the HEMS controller 700C transmits a status acquisition request to the air conditioner 901 at the time interval Q.

Here, it is assumed that the HEMS controller 700C detects that the status of the air conditioner 901 has changed after transmitting a status acquisition request three times after transmitting the control instruction. The HEMS controller 700C notifies the server apparatus 100C of the number of transmissions of a status acquisition request.

The server apparatus 100C changes the time interval P (i) by using the previously detected number of transmissions so that the number of transmissions of a status acquisition request that is to be transmitted to detect a change in the status again is reduced to be smaller than the previously detected number. That is, the server apparatus 100C changes the time interval P (i) to the time interval P (j+1). More specifically, in a case where the previously detected number of transmissions (hereinafter "K") is three or more, the server apparatus 100C changes the time interval P (i) by using the previously detected number of transmissions "K". Specifically, the server apparatus 100C changes the time interval P (j) to the time interval P (j+1) in accordance with the following rule. Note that "K" is a natural number of one or more.

In a case where the previously detected number of transmissions is one $$P(j+1)=P(j)-Q \quad \text{(expression 1)}$$

In a case where the previously detected number of transmissions is two $$P(j+1)=P(j) \quad \text{(expression 2)}$$

In a case where the previously detected number of transmissions is three or more $$P(j+1)=P(j)+Q\times(K-2) \quad \text{(expression 3)}$$

For example, in the state (i), the detected number of transmissions is three. Thus, the server apparatus 100C calculates P (j+1) by using expression 3.

$$P(j+1)=P(j)+1\times(3-2)=P(j)+1$$

In a case where P (j) is five seconds, for example, P (j+1) is six seconds.

When the server apparatus 100C receives a control instruction directed to the air conditioner 901 again, the server apparatus 100C transmits the control instruction and information representing the time interval P (j+1) to the HEMS controller 700C. Accordingly, in a case where the status of the air conditioner 901 changes at the same timing as that in the state (i), the HEMS controller 700C is able to detect the change in the status only by transmitting a status acquisition request twice (by performing polling twice) as shown in the state (ii). When detecting the change in the status of the air conditioner 901, the HEMS controller 700C changes the transmission interval of a status acquisition request from the time interval P (i) to the time interval C.

J. Control Structure

Figure 18:
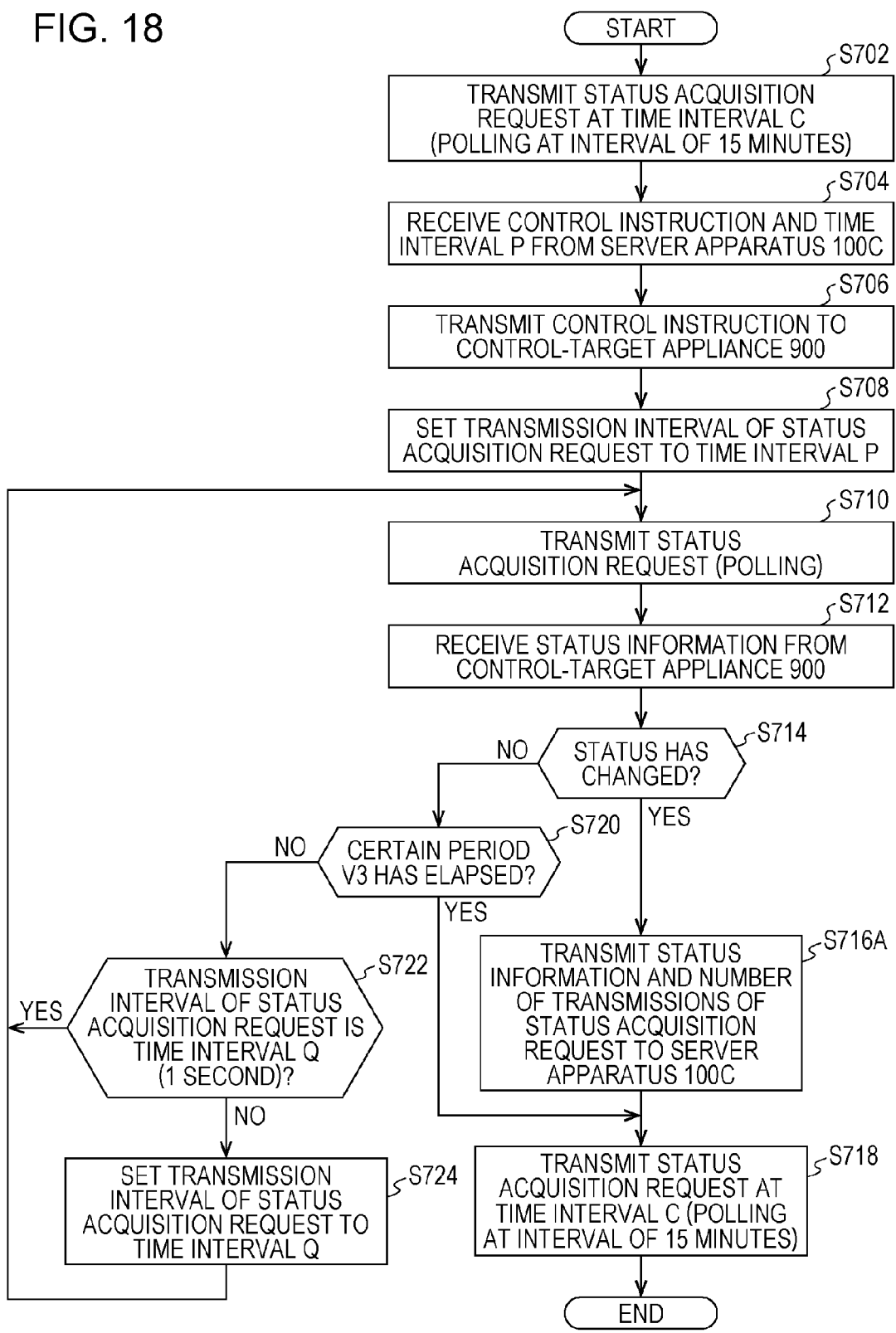
FIG. 18 is a flowchart for describing the flow of processing performed by a HEMS controller according to the fourth embodiment.

FIG. 18 is a flowchart for describing the flow of processing performed by the HEMS controller 700C. The flowchart illustrated in FIG. 18 is different from the flowchart illustrated in FIG. 15 in that the server apparatus 100B is replaced with the server apparatus 100C in step S704. Also, the flowchart illustrated in FIG. 18 is different from the flowchart illustrated in FIG. 15 in that step S716A is included instead of step S716. Thus, a description will be given of step S716A below, and the description of the other steps is not repeated.

If a positive determination is made in step S714 (YES in step S714), the HEMS controller 700C transmits information representing the status of the control-target appliance 900 and the number of transmissions of a status acquisition request (the number of polling operations) to the server apparatus 100C in step S716A. After this, the processing proceeds to step S718.

Figure 19:
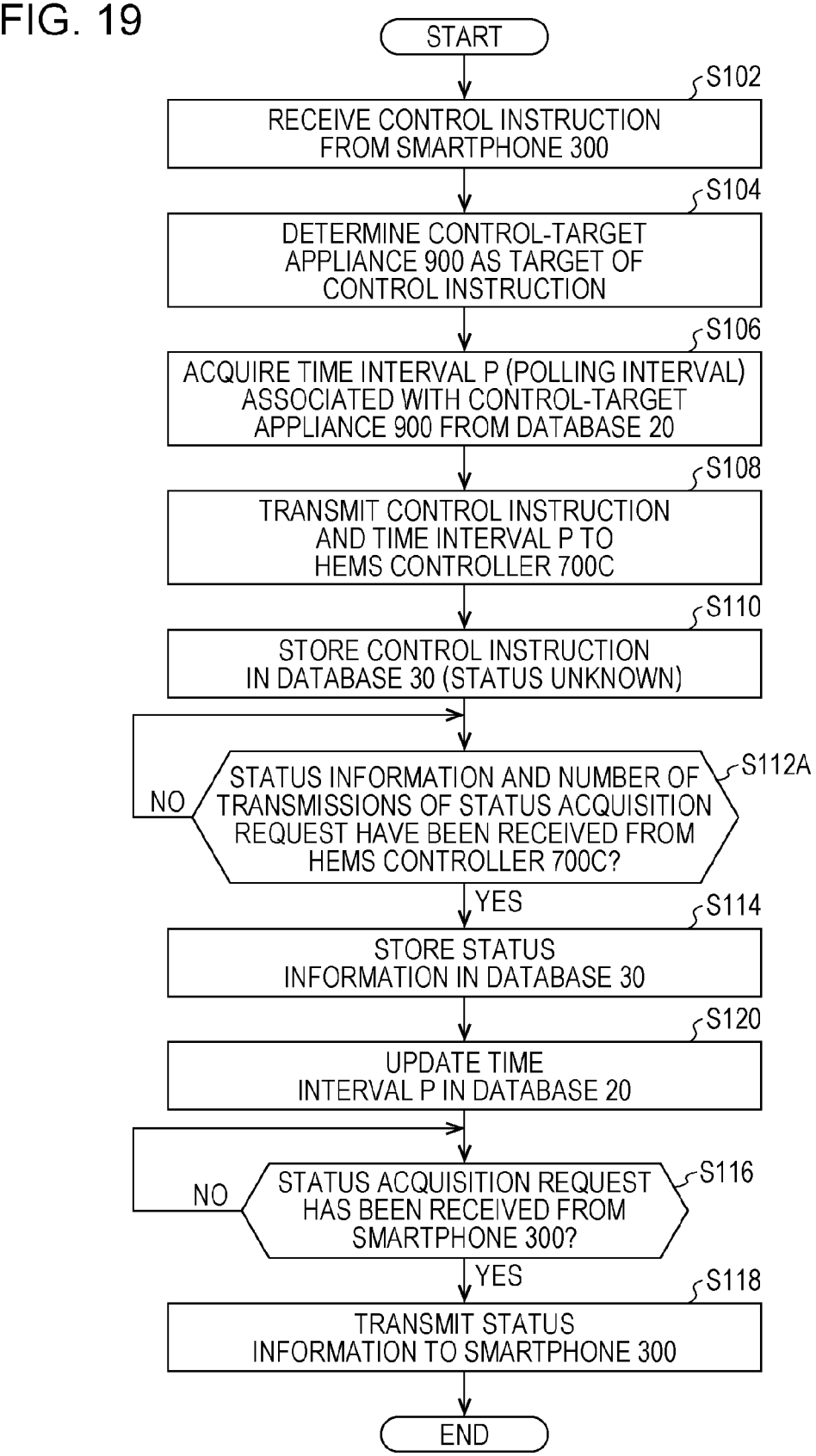
FIG. 19 is a flowchart for describing the flow of processing performed by a server apparatus according to the fourth embodiment.

FIG. 19 is a flowchart for describing the flow of processing performed by the server apparatus 100C. The flowchart illustrated in FIG. 19 is different from the flowchart illustrated in FIG. 6 in that the HEMS controller 700 is replaced with the HEMS controller 700C in step S108. Also, the flowchart illustrated in FIG. 19 is different from the flowchart illustrated in FIG. 6 in that step S112A is included instead of step S112. Further, the flowchart illustrated in FIG. 19 is different from the flowchart illustrated in FIG. 6 in that step S120 is included. Thus, a description will be given of steps S112A and S120, and the description of the other steps is not repeated.

In step S112A, the server apparatus 100C determines whether or not the server apparatus 100C has received information representing the status of the control-target appliance 900 and the number of transmissions of a status acquisition request from the HEMS controller 700C. If it is determined that the server apparatus 100C has received them (YES in step S112A), the processing proceeds to step S114. If it is determined that the server apparatus 100C has not received them (NO in step S112A), the processing returns to step S112A.

After step S114, the server apparatus 100C updates the time interval P in the database 20. Specifically, as described above, the server apparatus 100C updates the time interval P (j) to the time interval P (j+1). After step S120, the processing proceeds to step S116.

K. Specific Example of Update Processing of Time Interval P (j)

Now, a description will be given of a plurality of specific examples of update processing of the time interval P (j).

k1: First Specific Example

FIG. 20 is a diagram for describing a first specific example of update processing. Specifically, FIG. 20 is a diagram for describing the update processing that is performed in a case where the time interval P (1) for the air conditioner 901 is large (that is, in case where the initial value of the time interval P is large). In FIG. 20, P (1) is ten seconds.

Referring to FIG. 20, a state (i) shows the first time interval P (time interval P (1)) and the number of transmissions of a status acquisition request that has been transmitted at the time interval P (1) to detect a change in the status. A state (ii) shows the second time interval P (time interval P (2)) and the number of transmissions of a status acquisition request that has been transmitted at the time interval P (2) to detect a change in the status. A state (iii) shows the third time interval P (time interval P (3)) and the number of transmissions of a status acquisition request that has been transmitted at the time interval P (3) to detect a change in the status. A state (iv) shows the latest time interval P (in FIG. 20, time interval P (4)).

As shown in the state (i), in a case where the number of transmissions of a status acquisition request at the time interval P (1) is one, the server apparatus 100C sets the time interval P (2) to nine seconds in accordance with the above-described rule, as shown in the state (ii). As shown in the state (ii), in a case where the number of transmissions of a status acquisition request at the time interval P (2) is one, the server apparatus 100C sets the time interval P (3) to eight seconds in accordance with the above-described rule, as shown in the state (iii).

As shown in the state (iii), in a case where the number of transmissions of a status acquisition request at the time interval P (3) is two, the server apparatus 100C sets the time interval p (4) to eight seconds in accordance with the above-described rule, as shown in the state (iv). That is, as shown in the state (iii), the number of transmissions of a status acquisition request at the time interval P (3) is two, which is the optimal value, and thus the time interval P is not changed from eight seconds.

The optimal value is two for the following reason. If the number of transmissions of a status acquisition request is one, there is a high probability that the HEMS controller 700C will be able to acquire information representing a status from the control-target appliance 900 more quickly. If the number of transmissions of a status acquisition request is three or more, the HEMS controller 700C will be able to acquire information representing a status from the control-target appliance 900 more quickly by setting the time interval P so that the number of transmissions becomes two. Thus, the server apparatus 100C sets the optimal value of the number of transmissions of a status acquisition request to two and specifies the above-described rule so that the number of transmissions of a status acquisition request becomes two.

k2: Second Specific Example

Figure 21:
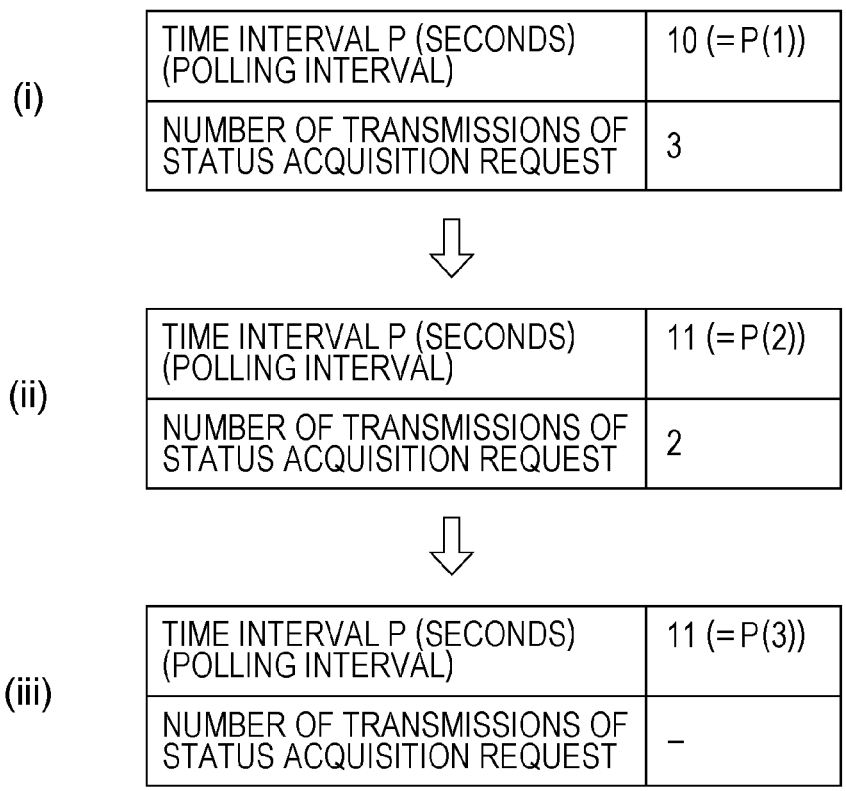
FIG. 21 is a diagram for describing a second specific example of update processing according to the fourth embodiment.

FIG. 21 is a diagram for describing a second specific example of update processing. Specifically, FIG. 21 is a diagram for describing the update processing that is performed in a case where the time interval P (1) for the air conditioner 901 is small (that is, in case where the initial value of the time interval P is small). In FIG. 21, P (1) is ten seconds as in FIG. 20.

Referring to FIG. 21, a state (i) shows the first time interval P (time interval P (1)) and the number of transmissions of a status acquisition request that has been transmitted at the time interval P (1) to detect a change in the status. A state (ii) shows the second time interval P (time interval P (2)) and the number of transmissions of a status acquisition request that has been transmitted at the time interval P (2) to detect a change in the status. A state (iii) shows the latest time interval P (in FIG. 21, time interval P (3)).

As shown in the state (i), in a case where the number of transmissions of a status acquisition request at the time interval P (1) is three, the server apparatus 100C sets the time interval P (2) to eleven seconds in accordance with the above-described rule, as shown in the state (ii). As shown in the state (ii), in a case where the number of transmissions of a status acquisition request at the time interval P (2) is two, the server apparatus 100C sets the time interval P (3) to eleven seconds in accordance with the above-described rule, as shown in the state (iii). That is, as shown in the state (ii), the number of transmissions of a status acquisition request at the time interval P (2) is two, which is the optimal value, and thus the time interval P is not changed from eleven seconds.

k3: Third Specific Example

FIG. 22 is a diagram for describing a third specific example of update processing. Specifically, FIG. 22 is a diagram for describing the update processing that is performed when the number of transmissions is increased due to a change in a communication environment where the time interval P for the air conditioner 901 is stable at nine seconds for a long time (in a steady state).

Referring to FIG. 22, a state (i) shows the m-th time interval P (time interval P (m)) and the number of transmissions of a status acquisition request that has been transmitted at the time interval P (m) to detect a change in the status. A state (ii) shows the m+1-th time interval P (time interval P (m+1)) and the number of transmissions of a status acquisition request that has been transmitted at the time interval P (m+1) to detect a change in the status. A state (iii) shows the latest time interval P (in FIG. 22, time interval P (m+2)). Note that "m" is a natural number of one or more.

As shown in the state (i), in a case where the number of transmissions of a status acquisition request at the time interval P (m) is two, the server apparatus 100C sets the time interval P (m+1) to nine seconds in accordance with the above-described rule, as shown in the state (ii). After this, as shown in the state (ii), in a case where the number of transmissions of a status acquisition request at the time interval P (m+1) is increased to three due to a change in a communication environment, the server apparatus 100C sets the time interval P (m+2) to ten seconds in accordance with the above-described rule, as shown in the state (iii). After this, the time interval P is updated until the steady state (the number of transmissions of a status acquisition request is two) occurs again.

k4: Fourth Specific Example

FIG. 23 is a diagram for describing a fourth specific example of update processing. Specifically, FIG. 23 is a diagram for describing the update processing that is performed when the number of transmissions is decreased due to a change in a communication environment where the time interval P for the air conditioner 901 is stable at nine seconds for a long time (in a steady state).

Referring to FIG. 23, a state (i) shows the n-th time interval P (time interval P (n)) and the number of transmissions of a status acquisition request that has been transmitted at the time interval P (n) to detect a change in the status. A state (ii) shows the n+1-th time interval P (time interval P (n+1)) and the number of transmissions of a status acquisition request that has been transmitted at the time interval P (n+1) to detect a change in the status. A state (iii) shows the latest time interval P (in FIG. 23, time interval P (n+2)). Note that "n" is a natural number of one or more.

As shown in the state (i), in a case where the number of transmissions of a status acquisition request at the time interval P (n) is two, the server apparatus 100C sets the time interval P (n+1) to nine seconds in accordance with the above-described rule, as shown in the state (ii). After this, as shown in the state (ii), in a case where the number of transmissions of a status acquisition request at the time interval P (n+1) is decreased to one due to a change in a communication environment, the server apparatus 100C sets the time interval P (n+2) to eight seconds in accordance with the above-described rule, as shown in the state (iii). After this, the time interval P is updated until the steady state (the number of transmissions of a status acquisition request is two) occurs again.

L. Functional Configuration

Figure 24:
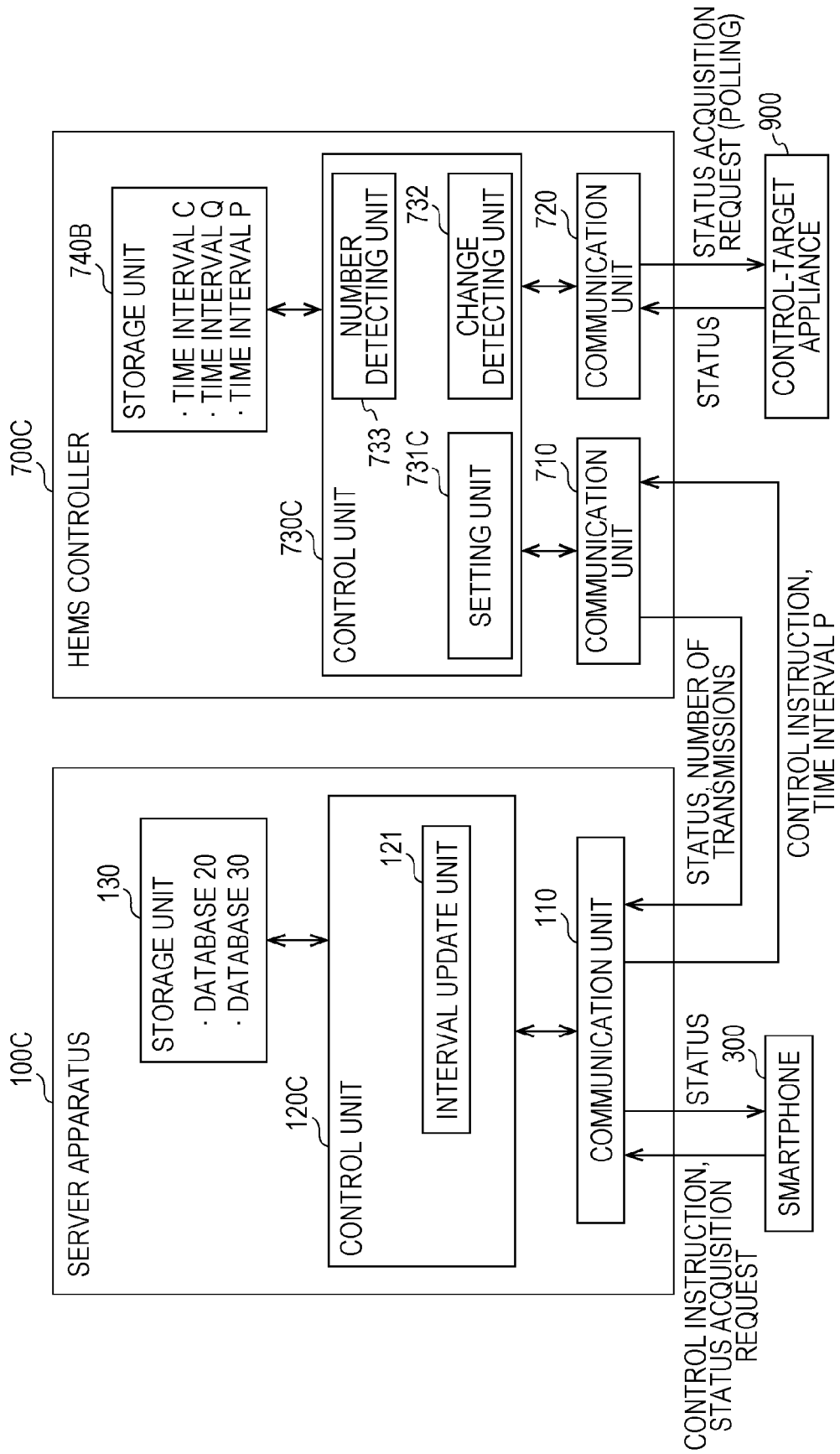
FIG. 24 is a functional block diagram for describing the functional configurations of the server apparatus and the HEMS controller according to the fourth embodiment.

FIG. 24 is a functional block diagram for describing the functional configurations of the server apparatus 100C and the HEMS controller 700C. Referring to FIG. 24, the server apparatus 100C includes the communication unit 110, a control unit 120C, and the storage unit 130. The control unit 120C includes an interval update unit 121.

The HEMS controller 700C includes the communication unit 710, the communication unit 720, a control unit 730C, and the storage unit 740B. The control unit 730C includes a setting unit 731C, the change detecting unit 732, and a number detecting unit 733.

The number detecting unit 733 detects the number of transmissions of a status acquisition request that has been transmitted to detect a change in the status of the control-target appliance 900 after a control instruction has been transmitted to the control-target appliance 900.

The server apparatus 100C stores a time interval P (=P (j)). The server apparatus 100C changes the stored time interval P by using the previously detected number of transmissions so that the number of transmissions of a status acquisition request that is to be transmitted to detect a change in the status again is reduced to be smaller than the previously detected number of transmissions. The server apparatus 100C notifies the HEMS controller 700C of the changed time interval P (=P (j+1)).

The setting unit 731C of the HEMS controller 700C sets the time interval P to the changed time interval P in response to retransmission of a control instruction to the control-target appliance 900. Also, the setting unit 731C sets the time interval P to the time interval Q in response to one transmission of a status acquisition request at the changed time interval P.

With the above-described configuration, the HEMS controller 700C is able to reduce the number of transmissions of a status acquisition request compared to the HEMS controller 700B according to the third embodiment.

Fifth Embodiment

As described above in the second embodiment, a configuration of changing the time interval P depending on the type of control instruction may be applied to the communication system 1 according to the above-described third and fourth embodiments. In this case, the server apparatuses 100B and 100C may store the database 20A (FIG. 13) instead of the database 20 (FIG. 2A).

Sixth Embodiment

In the above-described first to fifth embodiments, the server apparatuses 100, 100A, 100B, and 100C store the database 20 or the database 20A, but the present disclosure is not limited thereto.

The HEMS controllers 700, 700A, 700B, and 700C may store the database 20 or the database 20A, instead of the server apparatuses 100, 100A, 100B, and 100C.

In such a configuration, the server apparatuses 100, 100A, 100B, and 100C may transmit, in response to receipt of a control instruction from the smartphone 300, only the control instruction to the HEMS controllers 700, 700A, 700B, and 700C and do not transmit information representing the time interval P thereto. In response to receipt of the control instruction from the server apparatuses 100, 100A, 100B, and 100C, the HEMS controllers 700, 700A, 700B, and 700C may set the time interval P with reference to the database 20 or the database 20A.

Seventh Embodiment

The database 20 according to the above-described first and second embodiments may be provided for each HEMS controller 700 or each HEMS controller 700A. That is, databases 20 storing different pieces of data (typically, different time intervals P) may be associated with HEMS controllers installed in a plurality of buildings. In this case, the server apparatuses 100 and 100A may be configured so that the control-target appliance 900 can be registered and the time interval P can be changed from the smartphone 300.

Eighth Embodiment

In the above-described first to seventh embodiments, the server apparatuses 100, 100A, 100B, and 100C and the smartphone 300 may be configured in the following manner.

The server apparatuses 100, 100A, 100B, and 100C notify the smartphone 300 of the time interval P after step S110 and before step S112 or step S112A.

The smartphone 300 receives information representing the time interval P from the server apparatuses 100, 100A, 100B, and 100C. In this case, the smartphone 300 may transmit, to the server apparatuses 100, 100A, 100B, and 100C, a status acquisition request in step S308 after a period V4 (=P+Q+α) has elapsed, instead of step S306 (FIG. 5). Note that "α" is a constant that is appropriately set on the basis of an experiment or the like.

Ninth Embodiment

In the first and second embodiments, the HEMS controllers 700 and 700A may be configured to compare a command value included in a control instruction (for example, a set temperature in the case of the air conditioner 901) with a current status value of the control-target appliance 900, and gradually decrease the transmission interval of a status acquisition request from the time interval P as the difference between the command value and the status value becomes smaller.

Tenth Embodiment

In the first to ninth embodiments, a time interval P is set for each control-target appliance 900, but the present disclosure is not limited thereto. A time interval P may be set on the basis of the number of pieces of data transmitted to execute one control instruction (the number of transmissions of data). For example, in a case where the number of pieces of data transmitted to execute a control instruction α is one, the time interval P may be two seconds, in a case where the number of pieces of data is two, the time interval P may be five seconds, and in a case where the number of pieces of data is three, the time interval P may be ten seconds.

Eleventh Embodiment

In the first to ninth embodiments, a description has been given of the configuration in which, when receiving a control instruction from the smartphone 300, the server apparatuses 100, 100A, 100B, and 100C transmit the control instruction to the HEMS controllers 700, 700A, 700B, and 700C without receiving any request from the HEMS controllers 700, 700A, 700B, and 700C. However, the present disclosure is not limited thereto. The HEMS controllers 700, 700A, 700B, and 700C may request the server apparatuses 100, 100A, 100B, and 100C to transmit a control instruction. That is, the form of transmitting a control instruction to the HEMS controllers 700, 700A, 700B, and 700C may be a push type or pull type.

In addition, it has been illustrated in each of the first to ninth embodiments that based on the control instruction having been transmitted to the control-target appliance 900, the setting units 731, 731B, and 731C set the time interval at the time interval P shorter than the time interval C, but the present disclosure is not limited to this. The setting units 731, 731B, and 731C may be configured to set the time interval at the time interval P shorter than the time interval C after the HEMS controllers 700, 700A, 700B, and 700C receive the control instruction from the smartphone 300 via the server apparatuses 100, 100A, 100B, and 100C and before the HEMS controllers 700, 700A, 700B, and 700C transmit the control instruction to the control-target appliance 900.

CONCLUSION (1) A communication system (the communication system 1) includes a terminal apparatus (the smartphone 300), a server apparatus (the server apparatus 100, 100A, 100B, or 100C), a control apparatus (the HEMS controller 700, 700A, 700B, or 700C), and a control-target appliance (the control-target appliance 900). The control apparatus includes a first communication unit (the communication unit 720) configured to repeatedly transmit, to the control-target appliance, a signal (the status acquisition request) for detecting a change in a status of the control-target appliance at a set time interval, and, in response to receipt of a control instruction for controlling an operation of the control-target appliance from the terminal apparatus via the server apparatus, transmit the control instruction to the control-target appliance; a second communication unit (the communication unit 710) configured to, in response to detection of the change in the status, notify the terminal apparatus of the changed status via the server apparatus; and a setting unit (the setting unit 731, 731B, or 731C) configured to set the time interval. In a state where the time interval is set to a first time interval (the time interval C) by the setting unit, in a case where the first communication unit receives a control instruction for controlling an operation of the control-target appliance from the terminal apparatus via the server apparatus, the setting unit makes the time interval shorter than the first time interval.

With the above-described configuration, the terminal apparatus is able to quickly receive information representing a change in the status of the control-target appliance caused by a control instruction.

(2) More specifically, the setting unit may set the time interval to a second time interval (the time interval P) shorter than the first time interval in response to the transmission of the control instruction to the control-target appliance. The second time interval may differ between a case where the control instruction is directed to a first control-target appliance (for example, the air conditioner 901) and a case where the control instruction is directed to a second control-target appliance (for example, the electric shutter 903).

With the above-described configuration, the transmission interval of a predetermined signal can be changed to a time interval determined for each control-target appliance. Accordingly, the number of transmissions of an unnecessary predetermined signal can be reduced, compared to the case of uniformly changing the transmission interval of a predetermined signal for all the control-target appliances.

(3) In the server apparatus (the server apparatus 100A), the setting unit (the setting unit 731) may cause the second time interval to differ between a case where a type of the control instruction directed to the control-target appliance is a first type and a case where a type of the control instruction directed to the control-target appliance is a second type.

With the above-described configuration, the transmission interval of a predetermined signal can be changed to a time interval determined for each control-target appliance and for each control instruction. Accordingly, the number of transmissions of an unnecessary predetermined signal can be reduced, compared to the case of uniformly changing the transmission interval of a predetermined signal for all the control-target appliances and all the control instructions.

(4) The server apparatus (the server apparatus 100A) may store data (the database 20A in FIG. 13) in which identification information about the control-target appliance, a type of the control instruction, and the second time interval are associated with one another. In response to receipt of a control instruction of the first type (for example, the instruction to turn on or off the power) directed to the first control-target appliance (for example, the air conditioner 901) from the terminal apparatus, the server apparatus notifies the control apparatus (the HEMS controller 700A) of the second time interval associated with identification information about the first control-target appliance and the first type with reference to the data.

With the above-described configuration, the control apparatus is able to know the second time interval for the first control-target appliance and for each control instruction. Further, with the above-described configuration, it is not necessary to store the data in the control apparatus that is installed in each building. Thus, in a case where a service provider (for example, an operator of the server apparatus) wants to change the transmission interval of a predetermined signal, the service provider only has to change the data in the server apparatus. Accordingly, efforts of management performed by the service provider can be reduced.

(5) The setting unit (the setting unit 731B) may set the time interval to the second time interval shorter than the first time interval in response to the transmission of the control instruction. The setting unit may set the time interval to a third time interval (the time interval Q) shorter than the second time interval in response to one transmission of the predetermined signal at the second time interval.

With the above-described configuration, the terminal apparatus is able to quickly know the status of the control-target appliance compared to the configuration of repeatedly transmitting the predetermined signal at the second time interval.

(6) The control apparatus (the HEMS controller 700C) may further include a detecting unit (the number detecting unit 733) configured to detect the number of transmissions of the predetermined signal that is transmitted to detect a change in the status after the control instruction has been transmitted to the control-target appliance. The server apparatus (the server apparatus 100C) may store the second time interval (=P (j)). The server apparatus may change the stored second time interval by using the detected number of transmissions so that the number of transmissions of the predetermined signal that is to be transmitted to detect a change in the status again is reduced to be smaller than the detected number of transmissions. The server apparatus may notify the control apparatus of the changed second time interval (=P (j+1)). The setting unit (the setting unit 731C) of the control apparatus may set the time interval to the changed second time interval in response to retransmission of the control instruction to the control-target appliance. Also, the setting unit may set the time interval to the third time interval in response to one transmission of the predetermined signal at the changed second time interval.

With the above-described configuration, the control apparatus (the HEMS controller 700C) is able to reduce the number of transmissions of the predetermined signal compared to the control apparatus (the HEMS controller 700B).

The present disclosure contains subject matter related to that disclosed in Japanese Priority Patent Application JP 2014-061821 filed in the Japan Patent Office on Mar. 25, 2014, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system comprising a terminal apparatus, a relay apparatus, and a control-target appliance,
   when said relay apparatus receives, from said terminal apparatus, a control instruction for controlling an operation of said control-target appliance, said relay apparatus is configured to set a transmission interval of repeatedly transmitting, in order to detect a change in a status of said control-target appliance, a polling signal to said control-target appliance to be shorter than a preset polling interval,
   based on said change in the status having been detected, said relay apparatus is configured to provide said terminal apparatus with notification of said status having been changed,
   wherein
   said relay apparatus includes a server apparatus and a control apparatus communicatively connected to said server apparatus,
   said control apparatus includes:
      a first communication unit configured to repeatedly transmit said polling signal to said control-target appliance at said polling interval and transmit said control instruction to said control-target appliance when said first communication unit receives said control instruction from said terminal apparatus via said server apparatus, and
      a second communication unit configured to provide, based on said change in the status having been detected, said terminal apparatus with the notification of said status having been changed, said notification being provided via said server apparatus, and
      a setting unit configured to set said polling interval,
         when said first communication unit receives said control instruction from said terminal apparatus via said server apparatus while said polling interval is set at a first time interval by said setting unit said setting unit sets said polling interval at a second time interval shorter than said first time interval,
   said communication system includes a first appliance and a second appliance each as said control-target appliance, and
   said second time interval differs between a case where said control instruction is for said first appliance and a case where said control instruction is for said second appliance.

2. The communication system according to claim 1, wherein
   said setting unit is configured to set said second time interval to differ between a case where a type of said control instruction for said first appliance is a first type and a case where said type of said control instruction for said first appliance is a second type.

3. The communication system according to claim 2, wherein
   said server apparatus is configured to store data including identification information for said control-target appliance, said type of said control instruction, and said second time interval that are associated with one another, and
   based on said first type of said control instruction for said first appliance having been received from said terminal apparatus, said server apparatus is configured to make reference to said data to provide said control apparatus with notification of said second time interval associated with the identification information for said first appliance and said first type.

4. The communication system according to claim 1, wherein based on said polling signal having been transmitted once at said second time interval, said setting unit sets said polling interval at a third time interval shorter than said second time interval.

5. The communication system according to claim 4, wherein
   said control apparatus further includes a detecting unit configured to detect the number of transmissions of said polling signal until said change in the status is detected after said control instruction is transmitted to said control-target appliance,
   said server apparatus is configured to store said second time interval,
   said server apparatus is configured to change the stored second time interval using the detected number of transmissions such that the required number of transmissions of said signal to detect said change in the status again becomes less than the detected number of transmissions,
   said server apparatus is configured to provide said control apparatus with notification of said second time interval having been changed,
   based on said control instruction having been transmitted to said control-target appliance again, said setting unit is configured to set said polling interval at said second time interval having been changed, and based on said polling signal having been transmitted once at said second time interval having been changed, said setting unit sets said polling interval at said third time interval.

6. The communication system according to claim 4, wherein said communication system includes a first appliance and a second appliance each as said control-target appliance, and said second time interval differs between a case where said control instruction is for said first appliance and a case where said control instruction is for said second appliance.

7. The communication system according to claim 6, wherein said setting unit is configured to set said second time interval to differ between a case where a type of said control instruction for said first appliance is a first type and a case where said type of said control instruction for said first appliance is a second type.

8. The communication system according to claim 1, wherein based on said control instruction having been transmitted to said control-target appliance, said setting unit is configured to set said polling interval at said second time interval.

9. A relay apparatus capable of communicating with a terminal apparatus and a control-target appliance comprising:

a setting unit configured to set, when said relay apparatus receives, from said terminal apparatus, a control instruction for controlling an operation of said control-target appliance, a transmission interval of repeatedly transmitting, in order to detect a change in a status of said control-target appliance, a polling signal to said control-target appliance to be shorter than a preset polling interval, a communication unit configured to provide, based on said change in the status having been detected, said terminal apparatus with notification of said status having been changed, when said communication unit receives said control instruction from said terminal apparatus via a server apparatus while said polling interval is set at a first time interval by said setting unit, said setting unit sets said polling interval at a second time interval shorter than said first time interval, said second time interval differs between a case where said control instruction is for said control-target apparatus being a first appliance and a case where said control instruction is for said control-target apparatus being a second appliance.

10. A control apparatus capable of communicating with a server apparatus and a control-target appliance comprising:

a first communication unit configured to repeatedly transmit a polling signal for detecting a change in a status of said control-target appliance to said control-target appliance at a set polling interval and transmit a control instruction for controlling an operation of said control-target appliance to said control-target appliance when said first communication unit receives said control instruction from a terminal apparatus via said server apparatus; and a second communication unit configured to provide, based on said change in the status having been detected, said terminal apparatus with notification of said status having been changed, said notification being provided via said server apparatus, and a setting unit configured to set said polling interval, when said first communication unit receives said control instruction from said terminal apparatus via said server apparatus while said polling interval is set at a first time interval by said setting unit, said setting unit is configured to set said polling interval at a second time interval shorter than said first time interval, said second time interval differs between a case where said control instruction is for said control-target apparatus being a first appliance and a case where said control instruction is for said control-target apparatus being a second appliance.

11. A control method for a relay apparatus capable of communicating with a terminal apparatus and a control-target appliance, the control method comprising the steps of:

receiving, from said terminal apparatus, a control instruction for controlling an operation of said control-target appliance;

when said control instruction is received, setting a transmission interval of repeatedly transmitting, in order to detect a change in a status of said control-target appliance, a polling signal to said control-target appliance to be shorter than a preset polling interval;

when said communication unit receives said control instruction from said terminal apparatus via a server apparatus while said polling interval is set at a first time interval by said setting unit, setting said polling interval at a second time interval shorter than said first time interval, wherein second time interval differs between a case where said control instruction is for said control-target apparatus being a first appliance and a case where said control instruction is for said control-target apparatus being a second appliance.

12. A control method for a control apparatus capable of communicating with a server apparatus and a control-target appliance, the control method comprising the steps of:

repeatedly transmitting a polling signal for detecting a change in a status in said control-target appliance to said control-target appliance at a set polling interval and transmitting a control instruction for controlling an operation of said control-target appliance to said control-target appliance when said control instruction is received from a terminal apparatus via said server apparatus;

providing, based on said change in the status having been detected, said terminal apparatus with the notification of said status having been changed, said notification being provided via said server apparatus; and when said control apparatus receives said control instruction from said terminal apparatus via said server apparatus while said polling interval is set at a first time interval, setting said polling interval at a second time interval shorter than said first time interval wherein second time interval differs between a case where said control instruction is for said control-target apparatus being a first appliance and a case where said control instruction is for said control-target apparatus being a second appliance.

13. A control apparatus capable of communicating with a server apparatus and a control-target appliance, comprising:

a communication interface; and a processor;

said communication interface is configured to:

repeatedly transmit a polling signal for detecting a change in a status of said control-target appliance to said control-target appliance at a set polling interval and transmit a control instruction for controlling an operation of said control-target appliance to said control-target appliance when said first communication unit receives said control instruction from a terminal apparatus via said server apparatus; and based on said change in the status having been detected, provide said terminal apparatus with notification of said status having been changed, said notification being provided via said server apparatus, said processor is configured to set said polling interval, when said communication interface receives said control instruction from said terminal apparatus via said server apparatus while said polling interval is set at a first time interval by said processor;

wherein said processor is configured to set said polling interval at a second time interval shorter than said first time interval; and wherein second time interval differs between a case where said control instruction is for said control-target apparatus being a first appliance and a case where said control instruction is for said control-target apparatus being a second appliance.

* * * * *